United States Patent

Masunaga et al.

[11] Patent Number: 5,838,368
[45] Date of Patent: Nov. 17, 1998

[54] REMOTE CAMERA CONTROL SYSTEM WITH COMPENSATION FOR SIGNAL TRANSMISSION DELAY

[75] Inventors: Makoto Masunaga; Yasuyuki Ohiwa, both of Tokyo, Japan

[73] Assignee: Canon Kabushiki Kaisha, Tokyo, Japan

[21] Appl. No.: 79,616

[22] Filed: Jun. 18, 1993

[30] Foreign Application Priority Data

Jun. 22, 1992 [JP] Japan ................................. 4-162717
Jul. 1, 1992 [JP] Japan ................................. 4-174450

[51] Int. Cl.⁶ .................................................. H04N 5/232
[52] U.S. Cl. ........................ 348/211; 348/143; 348/169
[58] Field of Search .................................. 348/211, 214, 348/207, 142, 143, 14, 15, 16, 169, 170, 36, 37, 39

[56] References Cited

U.S. PATENT DOCUMENTS

| 3,984,628 | 10/1976 | Sharp ...................................... 348/211 |
| 4,516,156 | 5/1985 | Fabris et al. ............................. 348/15 |
| 5,109,278 | 4/1992 | Erickson et al. ......................... 348/207 |
| 5,111,288 | 5/1992 | Blackshear ............................... 348/143 |
| 5,315,633 | 5/1994 | Champa .................................... 348/18 |
| 5,570,177 | 10/1996 | Parker et al. ............................ 348/196 |
| 5,572,317 | 11/1996 | Parker et al. ............................ 348/169 |

*Primary Examiner*—Wendy Garber
*Assistant Examiner*—Tuan V. Ho
*Attorney, Agent, or Firm*—Robin, Blecker & Daley

[57] ABSTRACT

In a camera control system, a video signal from a camera is displayed on a monitor with some delay. An operation signal from a joystick disposed on the side of the monitor is transmitted to a data comparison circuit through a transmission system, a control unit and a counter. A panning operation on the camera is performed through a motor by applying a driving signal from a panhead driving circuit according to a difference between the operation signal and panning position detection data from a panning position detector. After that, in response to a signal indicating a stop of operation on the joystick, the control unit sends delayed panning position detection data obtained from a data delay circuit to the data comparison circuit. The panned position of the camera is thus shifted back to the panning position indicated by the delayed data obtained when the panning operation is stopped. The tilting and zooming operations on the camera can be controlled also in the same manner.

20 Claims, 15 Drawing Sheets

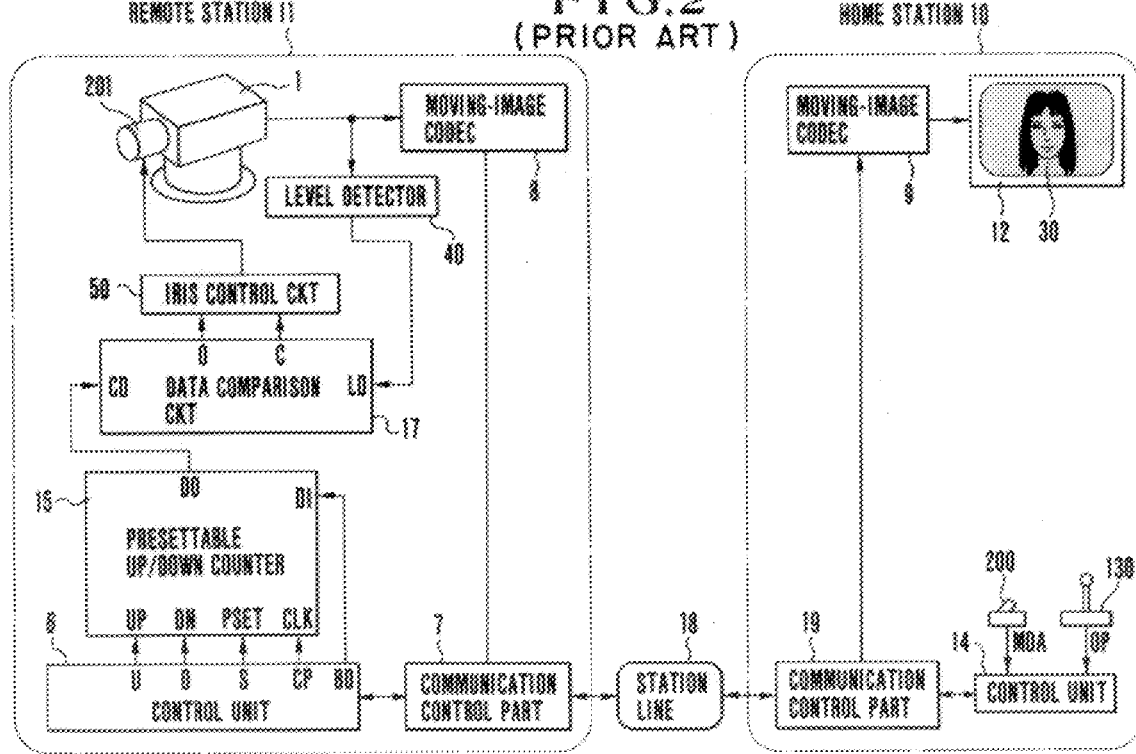

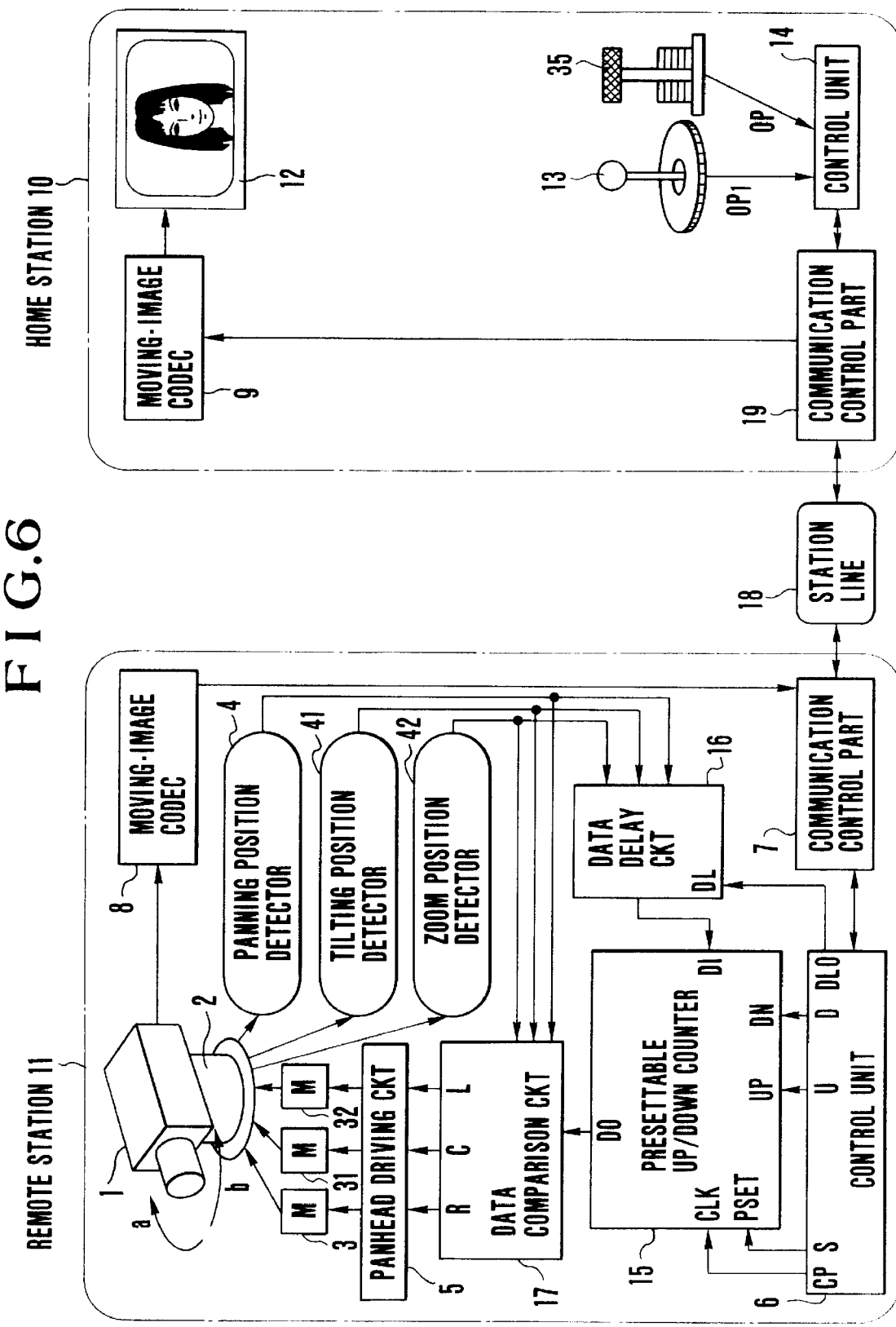

REMOTE CAMERA CONTROL SYSTEM WITH COMPENSATION FOR SIGNAL
TRANSMISSION DELAY

BACKGROUND OF THE INVENTION

1. Field of the Invention

This invention relates to a camera control system and more particularly to a camera control system advantageously adapted to a video conference system for smoothly carrying out various operations on a video camera, such as panning, tilting, zooming and adjustment of the amount of exposure from a remote place, 2. Description of the Related Art FIG. 1 shows by way of example the conventional arrangement of a camera control system of the above-stated kind. In the case of FIG. 1, the camera control system is applied to a video conference system for controlling the panning position of a video camera. Referring to FIG. 1, a home (or control) station 10 and a corresponding remote station 11 are connected to each other by a station line 18 (a communication network of public lines or the like). The remote station 11 includes a video camera 1 arranged to pick up an image of an object of shooting which is not shown, a motor-driven panhead 2 arranged to pan the video camera 1 (swing it right and left), a panning motor 3 arranged at the panhead 2 to move the video camera 1 to a desired panned position, a panhead driving circuit 5 which is provided for driving the video camera 1 to move in the direction of arrow "a" or "b" by causing the panning motor 3 to rotate forward or backward, a control unit 6 arranged to cause the video camera 1 to be panned in the direction arrow "a" or "b" by giving a right turning instruction output R, a left turning instruction output L or a stop instruction output C to the panhead driving circuit 5, a moving-image codec (encoder-decoder) 8 which is a coding circuit provided for encoding a video signal obtained from the video camera 1 into a form suited to a communication line, and a communication control part 7 which is arranged to connect the control unit 6 and the moving-image codec 8 to the station line 18.

Meanwhile, the home station 10 includes a joystick 13 which is arranged to output an operation signal OP for varying the panning position of the video camera 1, a control unit 14 arranged to receive the operation signal OP from the joystick 13 and to generate a command for controlling the panning position of the video camera 1 in accordance with the operation signal OP, a moving-image codec 9 arranged to decode the coded video signal, a monitor TV set 12 arranged to display the video signal decoded by the moving-image codec 9, and a communication control part 19 arranged to connect the control unit 14 and the moving-image codec 9 to the station line 18.

FIG. 1 shows only a part of the image pickup system of the corresponding remote station 11 and shows only some parts of display and operation systems of the home station 10. These parts shown are combined with various other parts to form a video conference system. Further, while only the arrangement for control over the panning position of the video camera 1 is shown in FIG. 1, the video conference system of course includes other control systems, such as a system for control over a tilting action (vertically varying a slanting angle) on the video camera 1 and a system for control over zooming.

The conventional camera control system arranged in the above-stated manner operates as follows:

An image of an object which is not shown is picked up by the video camera 1. The picked-up image is encoded by the moving-image codec 8 and is outputted to the station line 18 via the communication control part 7 as a video signal. A video signal thus sent out to the station line 18 is received by the communication control part 19 of the home station 10. At the home station 10, the video signal is displayed on the monitor TV set 12 after it is decoded by the moving-image codec 9.

The moving image of the object picked up at the corresponding station 11 remotely located thus can be seen at the home station 10 on the monitor TV set 12 through the operation described above. In a case where a plurality of objects located at the remote station 11 are to be selected one after another, the video camera 1 is panned on the motor-driven panhead 2 on which the video camera 1 is mounted. For simplification of illustration, only the panning motor 3 is shown as connected to the motor-driven panhead 2. In actuality, however, a tilting motor, etc., are connected also to the motor-driven panhead 2. The shooting direction of the video camera 1 is thus arranged to be variable as desired.

The video camera 1 can be turned around in the direction of arrow "a" or "b" through the action of the motor-driven panhead 2 by causing the panhead driving circuit 5 to drive the panning motor 3 to rotate to the right or to the left. The image or images of any of the plurality of objects located in front of the video camera 1 thus can be selectively picked up as desired.

The panning position of the video camera 1 is of course controllable on the side of the corresponding remote station 11. It is, however, preferable for the operability of a video conference system to control the panning position of the video camera 1 on the side of the home station 10 at which video images are actually watched through the monitor TV set 12. Therefore, the joystick 13 is arranged on the side of the home station 10 to be operated to give an operation signal OP to the control unit 14 for controlling the panning position. A command formed according to this signal OP is sent out to the station line 18 through the communication control part 19. The command is transmitted to the control unit 6 via the communication control part 7 of the remote station 11. Upon receipt of the command, the control unit 6 disposed on the side of the remote station 11 interprets the command and supply a right turn instruction output R, a left turn instruction output L or a stop instruction output C to the panhead driving circuit 5 as applicable. The right turn instruction output R, the left turn instruction output L or the stop instruction output C corresponds to the operation performed on the joystick 13 at the home station 10.

In a case where it is desired to direct the video camera 1 toward a person who is located adjacent to the current object of shooting at the remote (corresponding) station 11, for example, while watching the image of the object on the monitor TV set 12 at the home station 10, the video camera 1 is panned by operating the joystick 13 at the home station 10. In this instance, the operation signal OP is supplied from the joystick 13 to the control unit 14. The control unit 14 then forms a command which corresponds to the operation signal OP. The command is sent out from the control unit 14 to the station line 18 via the communication control part 19. On the side of the remote station 11, the communication control part 7 receives this command from the station line 18. The command is supplied from the communication control part 7 to the control unit 6. The control unit 6 interprets the command and gives the right turn instruction output R, the left turn instruction output L or the stop instruction output C to the panhead driving circuit 5, as applicable according to the instruction issued from the joystick 13. Then, in accordance with the driving instruction signal (output) from the control unit 6, the panhead driving circuit 5 in turn gives a driving signal to the panning motor 3 for causing it to rotate to the right or to the left or to stop rotating according to the driving signal. As a result, the video camera 1 is caused by the panhead 2 to turn round in the direction of arrow "a" or "b" and then to come to a stop in a desired position. The operation on the joystick 13 thus enables a participant or participants in the video conference on the side of the home station 10 to have a desired visual field of shooting by the video camera 1 while watching video images obtained on the monitor TV set 12.

FIG. 2 shows by way of example the arrangement of the conventional camera control system related to image pickup exposure control and particularly to control over the amount of exposure of a video camera applied to a video conference system. In FIG. 2, the illustration of the remote (corresponding) station 11 includes a photo-taking lens 201 which is provided with an iris for determining an amount of exposure in addition to focusing and zooming actions. On the side of the remote station 11, a level detector 40 is arranged to detect the level of a video signal obtained from the video camera 1 and to output level data as a result of the detection. An iris control circuit 50 is arranged to drive the iris of the photo-taking lens 201 to adjust the aperture thereof to an open position or to a stopped down position. A presettable up/down counter 15 functions to preset data given to its digital input terminal DI in response to a trigger signal applied to its preset terminal PSET, to output the data to its digital output terminal DO, and to up-count or down-count the data outputted from the digital output terminal DO. The presettable up/down counter 15 is thus arranged to preset data coming from the reference data output terminal BD of the control unit 6 through the preset data input terminal DI, and to supply this data to the reference data output terminal DO by up-courting or down-counting the data. A data comparison circuit 17 is arranged to compare a data input received from the level detector 40 via its detection data input terminal LD with the data received from the presettable up/down counter 15 via its reference data input terminal CD, and to give a control signal from its output terminal O or C to the iris control circuit 50 as an open driving signal or stop-down driving signal according to the result of the comparison.

On the side of the home station 10, an auto/manual selection part 200 is arranged to permit selection between automatic control and manual control for control over the iris of the photo-taking lens 201 of the video camera 1. An iris operation part 130 is arranged to output an operation signal for allowing a manual operation on the iris (stop) of the photo-taking lens 201. The control unit 14 is arranged to receive a selection signal MOA from the auto/manual selection part 200 and the operation signal OP from the iris operation part 130 and to generate a command for exposure control over the video camera 1. Other component parts are arranged in the same manner as those shown in FIG. 1. While FIG. 2 thus shows only the arrangement of component parts related to the exposure control over the video camera 1, the camera control system of course includes other control systems such as the panning control system described in the foregoing, a tilting control system, a zooming control system and other operation systems of varied kinds.

The conventional system arranged in the manner as shown in FIG. 2 operates as described below:

Like other conventional camera control systems, the conventional system described permits having a sight, at the home station 10, of a moving image of an object located at the remote station 11. In this case, the iris of the photo-taking lens 201 is controlled either by an automatic manner or in a manual manner. These control operations are described below with reference to FIGS. 3(A) to 3(F):

When the automatic operation is selected by the auto/manual selection part 200 at the home station 10, a selecting operation signal MOA is supplied from the auto/manual selection part 200 to the control unit 14. The control unit 14 forms a command for the automatic operation and sends the command to the control unit 6 of the remote (corresponding) station 11 via the communication control part 19, the station line 18 and the other communication control part 7. The control unit 6 interprets this command. The control unit 6 then outputs reference data for the level of the video signal output of the video camera 1 according to the aperture of the phototaking lens 201 from the reference data output terminal BD. The reference data is supplied to the preset data input terminal DI of the presettable up/down counter 15. Next, the control unit 6 instructs, from its count pulse output terminal CP, the presettable up/down counter 15 to preset the data of its preset data input terminal DI at its data preset instruction input terminal PSET.

Through the above-stated actions, the reference data is preset at the presettable up/down counter 15. The reference data is then outputted from the reference data output terminal DO. The reference data is supplied to the reference data terminal CD of the data comparison circuit 17. Meanwhile, the video camera 1 outputs a video signal. The level detector 40 detects the level of the video signal and outputs data which corresponds to the level detected. This level corresponds to the aperture position of the iris of the photo-taking lens 201. The level is high if the iris (aperture) position is on the side of its full open position and is low if the position is on its stopped-down side. The level data is supplied to the detection data input terminal LD. The data comparison circuit 17 compares the input data received at the reference data terminal CD with the input data received at the detection data input terminal LD. The data comparison circuit 17 then supplies the iris control circuit 50 with an opening driving signal O if the input data of the reference data terminal CD is larger than the input data of the detection data input terminal LD or a stop-down driving signal C if the input data of the detection data input terminal LD is larger than the input data of the reference data terminal CD.

The level of the video signal output of the video camera 1 is adequately controlled through the actions described above. As a result, a display image 30 is displayed with the image having been adjusted to an apposite level as shown in FIG. 3(A).

In a case where the object located on the side of the remote station 11 includes a bright point having an extremely high illuminance, such as a case where a light source image 24 is included in the display image 30 as shown in FIG. 3(B), the level of the video signal output of the video camera 1 tends to become high due to the light source image 24. In such a case, therefore, the automatic exposure control is performed in such a way as to have an apposite level for a combined image of having the light source image 24 together with the display image 30 as shown in FIG. 3(B). In other words, as a result of such control, the desired display image 30 becomes too dark, because, in this instance, the level of the video signal detected by the level detector 40 become too high as a whole, and, despite the inadequate detection, the iris control circuit 50 and the data comparison circuit 17 cooperate to stop down the iris of the photo-taking lens 201 in such a way as to make the level equal to the input data obtained at the reference data terminal CD. In such a case, therefore, manual control over the iris of the photo-taking lens 201 must be selected on the side of the home station 10 by operating the auto/manual selection part 200. The iris operation part 130 is then manually operated to put in a necessary correction in such a way as to have the display image 30 displayed at an adequate level on the monitor TV set 12.

More specifically, the correcting action is initiated as follows: the connecting position of the auto/manual selection switch 200 is shifted to a manual position to give an instruction for the manual operation to the control unit 14 by means of the selection signal MOA. Then, an iris operation signal OP indicating an instruction for opening or stopping down the iris (stop) is given to the control unit 14. The control unit 14 generates a command which corresponds to the signal OP. The command is sent to the corresponding control unit 6 via the communication control part 19, the station line 18 and the communication control part 7.

The control unit 6 interprets this command. The control unit 6 then sends a signal U to its up-count instruction output terminal U if the command is for opening the iris or a signal D to its down-count instruction output terminal D if the command is for stopping down the iris. The signal U or D is inputted to the up-count instruction input terminal UP or the down-count instruction input terminal DN of the presettable up/down counter 15. The presettable up/down counter 15 then either increases or decreases a data output from its reference data output terminal DO in synchronism with count pulses given from the count pulse output terminal CP of the control unit 6 to its count pulse input terminal CLK. As a result, the reference data input CD of the data comparison circuit 17 becomes larger or smaller relative to the detection data input LD of the data comparison circuit 17. The data comparison circuit 17 then supplies an opening driving signal O or a stop-down driving signal C to the iris control circuit 50. In accordance with this signal O or C, the iris control circuit 50 adjusts the aperture position of the iris of the photo-taking lens 201 in the direction of opening or stopping down the aperture.

According to the arrangement of the conventional camera control system, the panning position of the video camera 1 is controlled not stepwise by operating the joystick 13 while monitoring a video image display on the monitor TV set 12 on the side of the home station 10. With the panning action thus controlled non-stepwise, however, it has been hardly possible to accurately determine the panning position of the video camera 1 due to a time delay resulting from the image coding, transmitting and decoding processes performed by the moving-image codecs 8 and 9.

The operation of the arrangement of FIG. 1 is described as follows, with reference to FIG. 4 which shows the panning action and FIGS. 5(A) to 5(C) which show images displayed on the monitor TV set 12. Assuming that the video camera 1 is facing in the direction of arrow A shown in FIG. 4 to pick up the image of a first object 20, the first object image 22 is obtained in the middle of the display on the monitor TV set 12 as shown in FIG. 5(A) in this instance.

If it is desired to obtain the image of a second object 21 when the video camera 1 is in this state, the panned position of the video camera 1 must be changed to direct the visual field of the video camera 1 in the direction of arrow B shown in FIG. 4. For this purpose, the joystick 13 is operated on the side of the home station 10. As a result, the facing direction of arrow A of the video camera 1 is changed to the direction of arrow B jointly by the panning motor 3 and the motor-driven panhead 2. The video image display on the monitor TV set 12 also comes to shift from the first object image 22 to a second object image 23. When the second object image 23 comes to the middle of the display image plane as shown in FIG. 5(B), the operation on the joystick 13 comes to a stop on the side of the home station 10. At this point of time, the image display is obtained with the video camera 1 facing in the direction of arrow B. However, the video image picked up by the video camera 1 requires a considerably long period of time before it is displayed on the monitor TV set 12, because it is necessary to code the video image by the moving-image codec 8, to send out the coded image via the station line 18, to have it received via the communication control part 19 and to have it decoded by the moving-image codec 9 before displaying it on the monitor TV set 12.

The length of this delay time is determined by the speed of the station line 18, the coding and decoding methods of the moving-image codecs 8 and 9. Generally, however, the delay time is about 0.5 sec with the speed of the station line 18 being about 64 kbps (kilobit/sec). In other words, while the video image is on display as shown in FIG. 5(B), the panning action on the video camera 1 is progressing further at that very point of time to shift its facing direction to the direction of arrow C, depending on the speed of panning. Under this condition, even if the panning operation by the joystick 13 is brought to a stop on the side of the home station 10 upon confirmation of attainment of the video image as shown in FIG. 5(B) on the monitor TV set 12, the panned position of the video camera 1 actually determined is in the direction of arrow C instead of the direction of arrow B. As a result, the second object image 23 which is the picked-up image of the second object 21 is eventually displayed in a deviated position on the left side of the display image plane of the monitor TV set 12 as shown in FIG. 5(C). In an extreme case, depending on the zooming position of the video camera 1, the second object image 23 might not be displayed in its entirety on the monitor TV set 12.

Further, as mentioned above, the image pickup exposure control system of the conventional camera control system is arranged to permit the operator to manually adjust the aperture position of the iris (not shown) of the photo-taking lens 201 of the video camera 1 to a position on its full open side or to a stopped-down position by operating the iris operation part 130 while watching the display on the monitor TV set 12 on the side of the home station 10. This arrangement, therefore, has presented a problem that the delay time due to the image coding, transmitting and decoding processes to be carried out through the moving-image codecs prevents fine control over the iris opening or stopping-down action.

This particular problem is described further with reference to FIGS. 3(A) to 3(F) as follows: even in a case where a display image 30 is obtained in an adequate exposure state as shown in FIG. 3(A) with the iris of the photo-taking lens 201 adequately controlled under an automatic control operation, the image 24 of an illumination light source often comes into the image plane as shown in FIG. 3(B) depending on the facing direction of the video camera 1. In such a case, the iris is controlled in such a way as to obtain an adequate brightness level of the image plane as a whole and, as a result, the display image 30 which is the most important part on the image plane become too dark.

To prevent the display image from becoming too dark as mentioned above, the operator selects the manual operation by operating the auto/manual selection part 200 and then operates the iris operation part 130 in such a way as to give an iris opening instruction for adequately correcting the brightness of the display image 30. In response to this instruction, the aperture position of the iris of the photo-taking lens 201 is shifted toward its full open position. The display image 30 on the monitor TV set 12 then gradually becomes brighter accordingly as the iris operation part is operated on the side of the home station 10. When the brightness of the display image 30 becomes adequate as shown in FIG. 3(C), the iris opening operation on the iris operation part 130 is brought to a stop. At this point of time, the display image 30 obtained on the monitor TV set 12 is an image picked up when the iris of the photo-taking lens 201 comes to an adequately opened (aperture) position. However, as mentioned in the foregoing, a considerably long period of time is necessary until the image picked up by the video camera 1 comes to be displayed on the monitor TV set 12 after all the processes of coding it by the moving-image codec 8, sending it to the station line 18 via the communication control part 7, receiving it at the communication control part 19 and decoding it by the moving-image codec 9.

As mentioned in the foregoing, this delay time is determined by the speed of the station line 18 and the coding and decoding methods of the moving-image codecs 8 and 9. Generally, however, the delay time is about 0.5 sec with the speed of the station line 18 arranged to be about 64 kbps, as mentioned above. In other words, the iris opening process at the photo-taking lens 201 further progresses from the adequate aperture position when the display image 30 is displayed with the adequate brightness as shown in FIG. 3(C). Therefore, with the iris opening operation stopped, on the side of the home station 10, upon confirmation of attainment of the adequate display image 30 on the monitor TV set 12 as shown in FIG. 3(C), the actual adjusted position of the iris of the photo-taking lens 201 is located nearer to the full open aperture position than the adequate aperture position. As a result, the display image on the monitor TV set 12 eventually becomes too bright as shown in FIG. 3(D). However, to correct this again, if an iris stopping-down operation is performed on the iris operation part 130, a delay similar to the above-stated delay causes an overrun (overshoot) of an iris stopping-down action, which results in an excessively dark display image as shown in FIG. 3(E). The problem of the overrun relative to the iris operation has been inevitable where the iris of the photo-taking lens (201) of a video camera (1) disposed at a remote station (11) must be remotely operated from a station (10) while watching a display of a picked-up image on a monitor TV set (12). It has been deemed necessary, therefore, to find some solution to this problem.

SUMMARY OF THE INVENTION

It is a principal object of this invention to provide solutions of the above-stated problems incidental to the delay time resulting from the moving-image coding, transmitting and decoding processes.

It is a more specific object of the invention to provide a camera control system which is capable of adequately adjusting the facing direction and zooming position of a video camera and also adjusting the state of exposure of a resultant video signal to a desired state irrespective of the above-stated delay time.

To attain this object, a camera control system embodying this invention is arranged as follows: an image of an object of shooting is picked up by a camera disposed at a corresponding remote station. Video image data obtained by coding the video signal of the picked-up image is transmitted to a home station. At the home station, the video image data is decoded into a video signal. In displaying the decoded video signal, when operation data instructing for varying the state of the video camera is sent to the corresponding remote station through operation means, a signal for varying the shooting conditions of the video camera on the basis of detection data indicating the detected state of the video camera relative to a shooting condition such as panning, tilting or zooming and the operation data is supplied, at the time of operating the operation means, to driving means for varying the shooting condition of the video camera. Then, when the operation on the operation means comes to a stop, a signal for varying the shooting condition of the video camera on the basis of the above-stated detection data and delayed state data which is obtained by delaying detection data indicating a state of the video camera obtained immediately before the stop of the operation is supplied to the above-stated driving means. In other words, the embodiment of this invention is arranged to control the panning, tilting and zooming positions of the video camera in anticipation of the delay time of display resulting from the coding, transmission and decoding processes performed on the moving image picked up by the video camera, so that the facing direction and the zooming position of the video camera can be controlled to bring the video camera into a desired state without any overrun.

Another embodiment of this invention is arranged as follows: an image of an object of shooting is picked up by a video camera as a picked-up video signal. A video image data is formed by coding the picked-up video signal. The video image data is transmitted from a corresponding remote station to a home station. The video image data is decoded into a video signal at the home station. Then, in displaying the decoded video signal at the home station, operation data formed by operating operation means to give an instruction for varying the exposure condition of the video camera is sent to the remote station as desired through the operation means. Then, at the time of the operation, a signal for varying the exposure condition of the video camera on the basis of the data of the operation and exposure state detection data relative to the exposure condition of the video camera is supplied to driving means which is provided for varying the exposure condition of the video camera. When the operation on the operation means comes to a stop, a signal for varying the exposure condition of the video camera on the basis of the above-stated exposure state detection data and delayed exposure data which indicates an exposure state obtained at the time of the stop of the operation and is obtained by delaying the exposure state detection data indicating an exposure state obtained immediately before the stop of the operation is supplied to the driving means. In other words, the iris of the video camera is controlled in anticipation of display delay time resulting from moving-image coding, transmitting and decoding processes, so that the exposure state of the video camera can be adequately controlled without any overrun on the basis of the video signal obtained from the video camera.

The above and other objects and features of this invention will become apparent from the following detailed description of embodiments thereof taken in conjunction with the accompanying drawings.

BRIEF DESCRIPTION OF THE DRAWINGS

FIG. 2 is a block diagram showing by way of example an image pickup exposure control system arranged in the conventional camera control system.

FIG. 6 is a block diagram showing a control system arrangement for panning, etc., in a camera control system arranged as an embodiment of this invention.

DETAILED DESCRIPTION OF THE PREFERRED EMBODIMENTS

Figure 1:
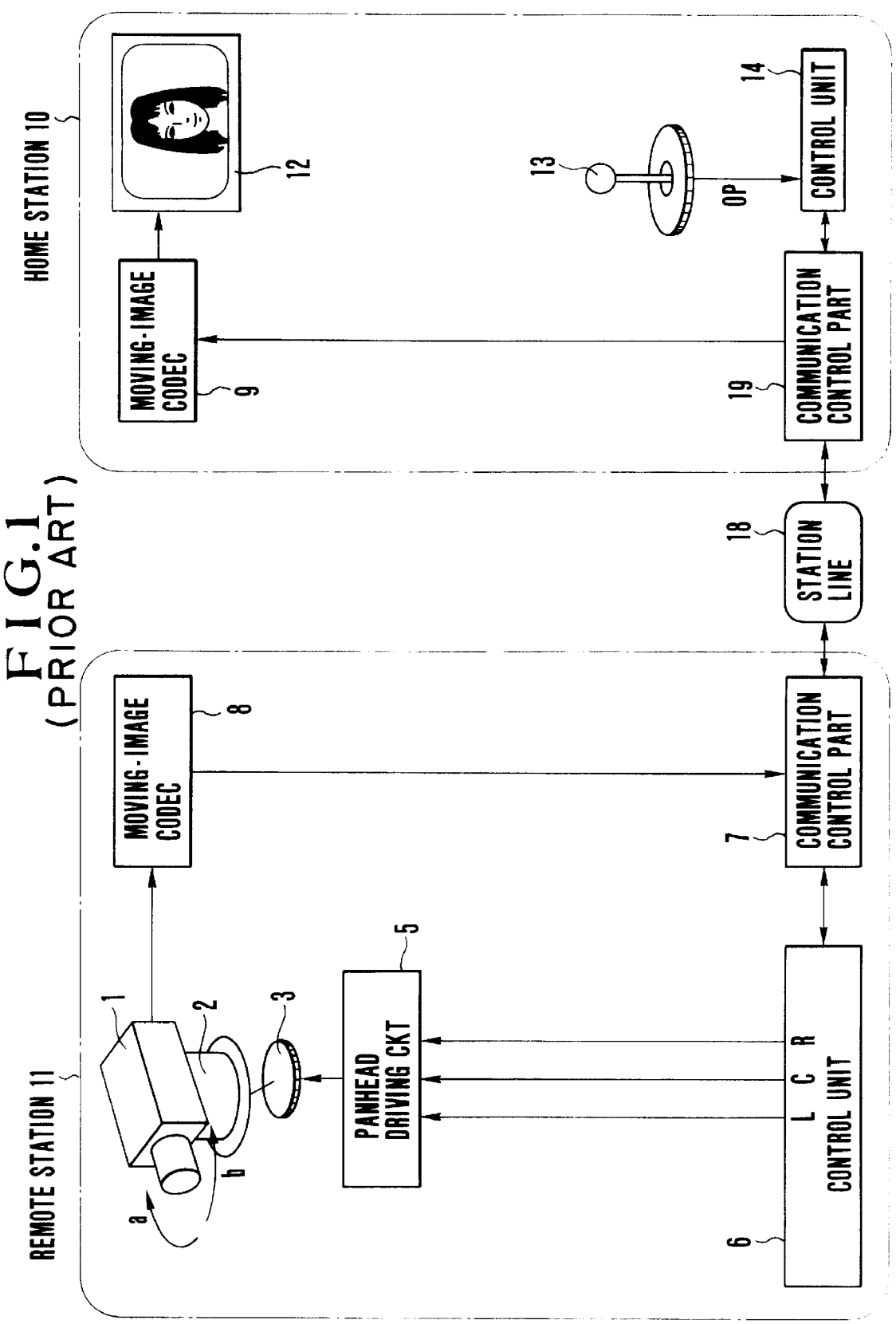
FIG. 1 is a block diagram showing by way of example a servo control system arranged in the conventional camera control system.

The following describes embodiments of this invention with reference to the accompanying drawings:

FIG. 6 shows the circuit arrangement of a camera control system arranged according to this invention to control the shooting conditions of the camera for panning, tilting and zooming. Referring to FIG. 6, a presettable up/down counter 15 is arranged to preset data (delay data) given to its digital input terminal DI in response to a trigger applied to its preset terminal PSET and to output the preset data to its digital output terminal DO, and is arranged to up-count or down-count a data output from the digital output terminal DO in synchronism with its clock input terminal CLK according to the state of its up-count input terminal UP or its down-count input terminal DN. A data delay circuit 16 is arranged to delay data outputted from a panning position detector 4 as much as a period of time given to its delay time setting input terminal DL and to output the delayed data. At the presettable up/down counter 15, the up-count input terminal UP and the down-count input terminal DN are connected respectively to an up-count designation output terminal U and a down-count designation output terminal D of the control unit 6. The clock input terminal CLK and the preset terminal PSET are connected respectively to a count pulse output terminal CP and a set output terminal S of the control unit 6. The data delay circuit 16 has its delay time setting input terminal DL connected to a delay time setting output terminal DLO of the control unit 6. The data output from the digital output terminal DO of the presettable up/down counter 15 is supplied to a data comparison circuit 17. The data comparison circuit 17 is arranged to receive, at the same time, data indicating a panned position of the (video) camera from the panning position detector 4. The data comparison circuit 17 compares these two data inputs with each other and supplies a right turn instruction output R, a left turn instruction output L or a stop instruction output C to a panhead driving circuit 5. The rest of the circuit arrangement is identical with the example of the conventional arrangement shown in FIG. 1.

The embodiment which is arranged as described above operates as described below:

An image of an object of shooting which is not shown is picked up by a video camera 1 at a corresponding remote station 11. The picked-up object image is coded by a moving-image codec 8 and is sent out as a video signal to a station line 18 via a communication control part 7. The video signal sent out to the station line 18 is received by a communication control part 19 of a home station 10. The video signal is decoded by a moving-image codec 9 and is then displayed on a monitor TV set 12. In this case, before any motion of a video image picked up by the video camera 1 comes to be displayed on the monitor TV set 12, a certain length of delay time is necessary for coding, transmitting and decoding processes as mentioned in the foregoing description of the prior art.

The above-stated operation of the camera control system makes it possible to see, on the monitor TV set 12 at the home station 10, the moving image of the object located at the corresponding remote station 11. In a case where there are a plurality of objects on the side of the remote station 11, the video camera 1 can be panned to select any of them. For this purpose, the video camera 1 is mounted on a motor-driven panhead 2. The panhead 2 enables the video camera 1 to have its panned position variable in the direction of arrow "a" or "b" by causing a panning motor 3 to rotate forward or backward through a panhead driving circuit 5. The image of any of the plurality of objects located in front of the video camera 1 thus can be selectively picked up as desired.

The panning position of the video camera 1 is actually controlled from the home station 10 at which the operator is watching video images on the monitor TV set 12. For this purpose, an operation signal OP1 for controlling the panning position is given to the control unit 14 by operating a joystick 13 which is provided on the side of the home station 10. The control unit 14 then sends a command which corresponds to this signal to the station line 18 through the communication control part 19.

This command is received by the control unit 6 of the remote station 11 from the station line 18 via the communication control part 7. In accordance with the command, the control unit 6 supplies a signal to the presettable up/down counter 15 either from its up-count instruction output terminal U or its down-count instruction output terminal D according to whether the instruction given by the joystick 13 is for a rightward turn or a leftward turn. Meanwhile, since count pulses are sent out from the count pulse output terminal CP of the control unit 6 to the presettable up/down counter 15, the data output from the digital output terminal DO of the presettable up/down counter 15 varies in synchronism with the count pulses. As a result, a difference arises between the data from the presettable up/down counter 15 and data from the panning position detector 4. The data comparison circuit 17 detects the difference by comparing these data and gives a right turn instruction output R, a left turn instruction output L or a stop instruction output C to the panhead driving circuit 5 according to the difference thus detected. In accordance with the output of the data comparison circuit 17, the panhead driving circuit 5 drives the panning motor 3. The panning motor 3 then moves the video camera 1 to the right or to the left. The period of the count pulses given from the control unit 6 to the presettable up/down counter 15 is set at such a value that never exceeds the speed of changes taking place in the data sent out from the panning position detector 4 as a result of changes in the panned position of the video camera 1 caused by the panhead driving circuit 5.

A certain predetermined length of delay time is set at the delay time setting input terminal DL of the data delay circuit 16 by a signal outputted from the delay time setting output terminal DLO of the control unit 6. This delay time is set at such a value that corresponds to a length of time required until a moving image picked up by the video camera 1 actually comes to be represented by the motion of a video image displayed on the monitor TV set 12 after the moving-image is coded by the moving-image codec 8, transmitted by the station line 18 and decoded by the moving-image codec 9. At the data delay circuit 16, the data which comes from the panning position detector 4 indicating the panned position of the video camera 1 is delayed as much as the set delay time, before the panned position indicating data is supplied to the digital input terminal DI of the presettable up/down counter 15.

Next, the panning operation on the video camera 1 of this embodiment is described with reference to FIG. 4 which shows the panning operation and FIGS. 5(A) to 5(C) which show images displayed on the monitor TV set 12. The video camera 1 is assumed to be now facing in the direction of arrow A to pick up the image of a first object 20. In this instance, a first object image 22 appears in the middle part of the display image plane of the monitor TV set 12 as shown in FIG. 5(A).

In obtaining the video image of a second object 21 after that of the first object 20, the panned position of the video camera 1 must be changed to have the visual field of the video camera 1 in the direction of arrow B. For this purpose, the panning operation is performed by using the joystick 13 on the side of the home station 10. As a result, the output of the presettable up/down counter 15 varies to have the visual field of the video camera 1 changed from the direction of arrow A to the direction of arrow B by the action of the motor-driven panhead 2. The image displayed on the monitor TV set 12 then shifts from the first object image 22 to a second object image 23.

When the second object image 23 comes to the middle of the display image plane, the operator on the side of the home station 10 stops operating the joystick 13. The image obtained as shown in FIG. 5(B) is obtained when the video camera 1 is facing in the direction of arrow B. At this point of time, however, the panning action performed by the panhead 2 on the video camera 1 is progressing further toward the direction of arrow C, although the extent of overrun depends on the speed of panning. Therefore, when the operation on the joystick 13 comes to a stop upon confirmation of having the video image as shown in FIG. 5(B), the actual panned position of the video camera 1 deviates toward the direction of arrow C. The second object image 23 which is a picked-up image of the second object 21 thus eventually comes to appear on the left side of the display image plane of the monitor TV set 12 as shown in FIG. 5(C).

The above-stated problem is solved by this embodiment in the following manner: when the operation on the joystick 13 comes to a stop, this state (the stopping action) is transmitted from the control unit 14 to the control unit 6 via the communication control part 19, the station line 18 and the communication control part 7. Upon receipt of information on this state, the control unit 6 stops the output of the up-count instruction output terminal U or that of the down-count instruction output terminal D and, at the same time, sends a pulse output to the set output terminal S. As a result, the presettable up/down counter 15 ceases to have any input to the up-count input terminal UP and the down-count input terminal DN and its up-count or down-count action comes to a stop. Then, in response to the pulse input to its preset terminal PSET, the presettable up/down counter 15 takes in data given from the data delay circuit 16 to the digital input terminal DI and supplies the data from the digital output terminal DO to the data comparison circuit 17.

Figure 4:
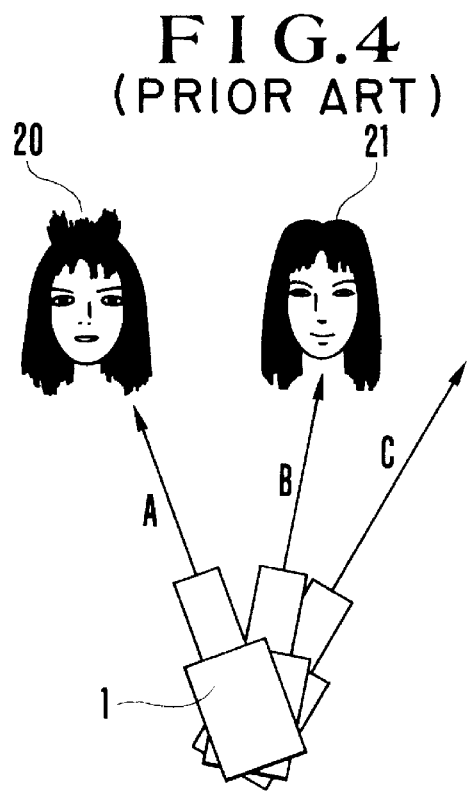
FIG. 4 shows a panning operation on a video camera.
Figures 5A, 5B, 5C:
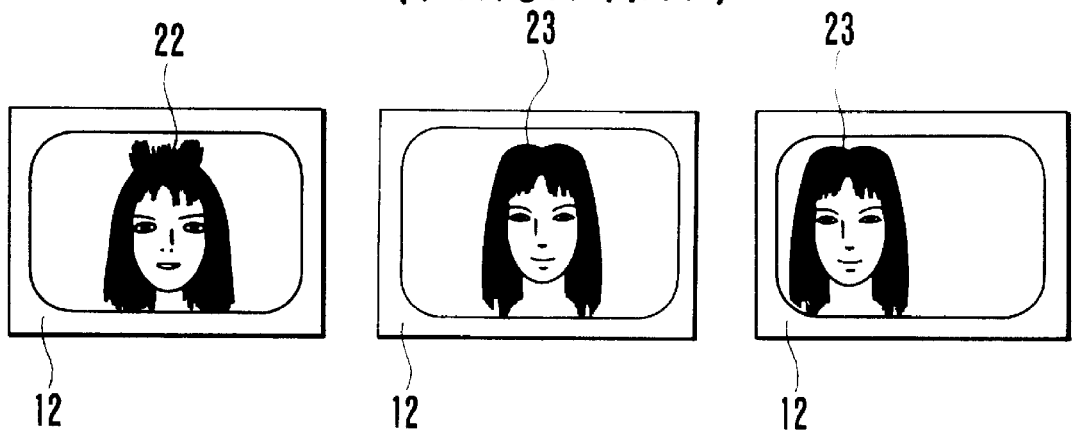
FIGS. 5(A) to 5(C) shows by way of example the states of display obtained on the display image plane of a monitor TV set according to a panning operation.

The data which is outputted, at this time, from the data delay circuit 16 indicating the panned position of the video camera 1 corresponds to the direction of arrow B shown in FIG. 4. In other words, the presettable up/down counter 15 then gives panning position data corresponding to the facing direction of arrow B of the video camera 1 to the data comparison circuit 17. As a result, a right turn instruction output R or a left turn instruction output L which is reverse to the current turning direction is given to the panhead driving circuit 5. The panning direction of the video camera 1 is then reversed from turning toward the direction of arrow C back to turning toward the direction of arrow B. After that, when the data of panned position of the video camera 1 supplied from the panning position detector 4 to the data comparison circuit 17 becomes equal to the data received from the presettable up/down counter 15, the data comparison circuit 17 detects this and supplies a stop instruction output C to the panhead driving circuit 5 to bring the movement of the video camera 1 to a stop.

As a result of the control described above, the video image displayed on the monitor TV set 12 of the home station 10 is corrected from the state of display shown in FIG. 5(C) into a state shown in FIG. 5(B), so that the second object image 23 can be displayed in the middle part of the monitor image plane as desired on the side of the home station 10. In other words, when the operator who is at the home station 10 sets the shooting direction of the video camera 1 as desired by operating the joystick 13 while watching the display on the monitor TV set 12, the embodiment of this invention is capable of accurately and promptly bringing the video camera 1 to a position where the object image is displayed on the monitor TV set 12 exactly in the same state as seen by the operator, despite the presence of the delay time which results from moving image coding, transmitting and decoding processes as mentioned above.

While the control operation of the embodiment has been described as performed on the panning position of the video camera 1, the embodiment can be arranged to perform other control operations in exactly the same manner as the panning position control. For example, a control operation on the tilting position of the video camera 1 can be accomplished by arranging a tilting position detector 41 and a tilting motor 31 in such a way as to permit a tilting position setting operation by using the joystick 13. Further, a control operation on the zoom position also can be accomplished in the same manner as the panning position control by arranging a zoom position detector 42 and a zooming motor 32 and by operating a zoom operation part 35 instead of the joystick 13.

Further, in the case of this embodiment, the data delay circuit 16, the presettable up/down counter 15, the data comparison circuit 17, etc., are arranged separately from the control unit 6 as discrete elements. However, it is of course possible to arrange the control unit 6 to include all the functions of these elements therein. In that instance, the control unit 6 can be arranged to accomplish these functions by means of a software arrangement. At the same time, a plurality of operating functions for panning, tilting and zooming also can be arranged in combination to perform control operations in the same manner as described above.

The delay time to be set at the data delay circuit 16 is preferably arranged to be variably settable either at the remote station 11 or at the home station 10 as desired in such a way as to permit adjustment of it, for example, according to variations in the lengths of time required for coding by the moving-image codec 8, for transmission by the station line 18 and for decoding by the moving-image codec 9.

Figure 7:
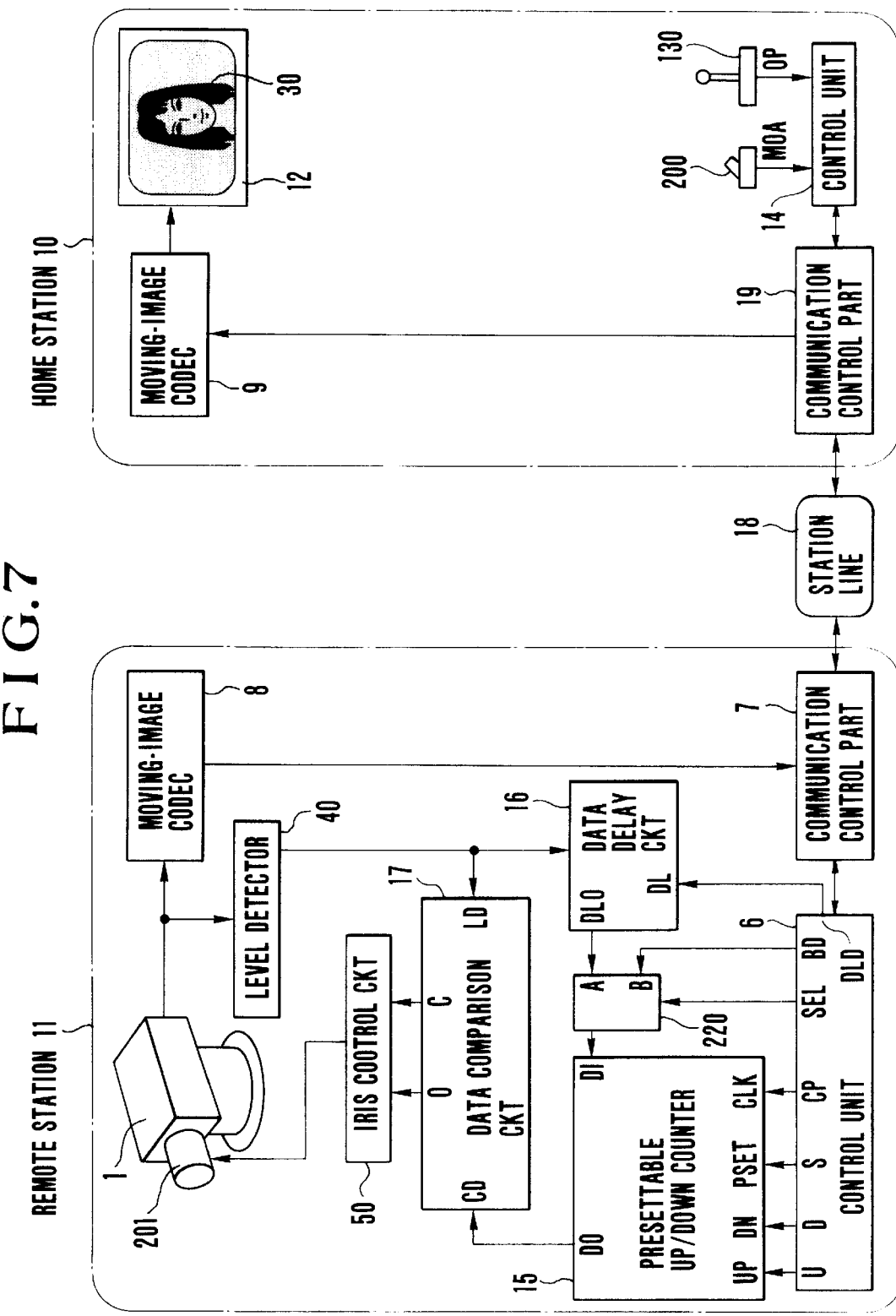
FIG. 7 is a block diagram showing the arrangement of an image pickup exposure control system of a camera control system arranged as an embodiment of this invention.

FIG. 7 shows a circuit arrangement for image pickup exposure control of a camera control system which is arranged as an embodiment of this invention. Referring to FIG. 7, a data delay circuit 16 is arranged to delay detection data received from a level detector 40 as much as a length of time indicated by a signal given to its data delay amount instruction input terminal DL from a data delay amount instruction output terminal DLO of a control unit 6, and to output the delayed detection data from a level data delay output terminal DLD. A data selector 220 is arranged to receive the data from the data delay circuit 16 at one input terminal A and also data from a reference data output terminal BD of the control unit 6 at another input terminal B. The data selector 220 selects either the input data of the input terminal A or the input data of the input terminal B in accordance with a signal coming from a data selection instruction output terminal SEL of the control unit 6 and supplies it to a reset data input terminal DI of a presettable up/down counter 15. With the exception of these parts, other component parts of the embodiment are arranged in the same manner as the conventional system shown in FIG. 2.

The operation of the circuit arrangement described above is as follows: an image of an object (not shown) is picked up by the video camera 1 arranged at the (corresponding) remote station 11. The object image is coded by the moving-image codec 8 as a video signal. The video signal is sent out from the moving-image codec 8 to the station line 18 via the communication control part 7. The video signal is received at the communication control part 19 and decoded by the moving-image codec 9 on the side of the home station 10. The decoded signal is displayed on the monitor TV set 12. As mentioned in the foregoing, a certain length of delay time is necessary before the motion of the image picked up by the video camera comes to be displayed on the monitor TV set 12 after the coding, transmitting and decoding processes.

The moving image of the object located at the remote station 11 is thus can be seen on the monitor TV set 12 at the home station 10. For adjustment of the amount of exposure of the video camera 1 according to the luminance of the object located at the remote station 11, the photo-taking lens 201 of the video camera 1 is provided with an iris which is not shown but is arranged to give a variable aperture value. This embodiment is arranged to permit either a manual control operation or an automatic control operation on the iris of the photo-taking lens 201. The control operation is described below with reference to FIGS. 3(A) to 3(F):

When the auto/manual selection part 200 is operated to select the automatic operation at the home station 10, a selecting operation signal MOA is supplied from the auto/manual selection part 200 to the control unit 14. In response to this signal MOA, the control unit 14 sends a command for the automatic operation through the communication control part 19, the station line 18 and the communication control part 7 to the control unit 6 of the remote station 11. The control unit 6 interprets this command. Then, in this instance, the control unit 6 acts as follows: reference data for the level of the video signal to be outputted from the video camera 1 according to the iris of the photo-taking lens 201 is outputted from the reference data output terminal BD. An instruction is sent out from the data preset instruction output terminal S to the data preset instruction input terminal PSET of the presettable up/down counter 15 to preset the input data of the preset data input terminal DI. At the same time, a signal is sent out from the data select instruction output terminal SEL to the data selector 220 to instruct the latter to select the input data received at its input terminal B.

As a result, the reference data for the level of the video signal is supplied from the reference data output terminal BD of the control unit 6 through the data selector 220 to the preset data input terminal DI of the presettable up/down counter 15. This reference data is preset at the presettable up/down counter 15 in synchronism with a clock signal obtained at the data preset instruction clock input terminal CLK and is then outputted from the reference data output terminal DO. This data output is supplied to the reference data input terminal CD of the data comparison circuit 17. Meanwhile, the video signal is outputted from the video camera 1. The level detector 40 detects the output level of the video signal and outputs data which corresponds to the level detected. This level corresponds to the state (aperture position) of the iris of the photo-taking lens 201. The level is high if the iris position is on the side of a full open aperture and is low if it is on the side of a stopped-down aperture. The detection data from the level detector 40 is supplied to the detection data input terminal LD of the data comparison circuit 17.

Figure 3A:
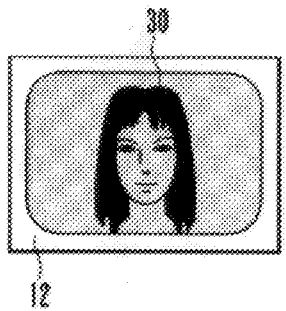
FIGS. 3(A) to 3(F) show by way of example the states of display obtained under exposure control on the display image plane of a monitor TV set.

The data comparison circuit 17 compares the input data of the detection data input terminal LD with the input data of the reference data input terminal CD. The data comparison circuit 17 supplies the iris control circuit 50 with an iris opening driving signal O if the input data of the reference data input terminal CD is larger than the input data of the detection data input terminal LD or an iris stopping-down driving signal if the input data of the detection data input terminal LD is larger than the input data of the reference data input terminal CD. The level of the video signal outputted from the video camera 1 is adequately controlled by these actions. As a result, an image 30 is displayed at an adequate level on the monitor TV set 12 on the side of the home station 10 as shown in FIG. 3(A). In this instance, the level detector 40 supplies the data corresponding to the exposure level also to the data delay circuit 16. At the data delay circuit 16, this data is delayed as much as a delay amount instructed from the data delay amount instruction output terminal DLO of the control unit 6 to the data delay amount instruction input terminal DL before it is outputted from the level delay output terminal DLD to the data selector 220. This output is, however, ignored by the data selector 220.

Figure 3B:
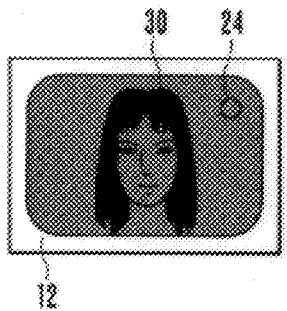

In the event of an object of shooting including a bright point of an extremely high illuminance, i.e., in a case where the display image 30 includes an image of a light source 24, for example, as shown in FIG. 3(B), the level of the video signal outputted from the video camera 1 tends to become higher due to the light source image 24. This tendency causes the automatic exposure control to result, as shown in FIG. 3(B), in a level which is too low (dark) for the main object image 30 though it is adequate as a whole including the light source image 24, because the level of the video signal detected by the level detector 40 becomes high as a whole. Then, the data comparison circuit 17 and the iris control circuit 50 jointly cause the iris of the photo-taking lens 201 to be stopped down in such a way as to equalize this detected level with the input data obtained at the reference data input terminal CD. In such a case, the operator of the camera control system operates the auto/manual selection part 200 on the side of the home station 10 to designate manual control over the iris of the photo-taking lens 201. Then, a manual operation is performed to put in a necessary correction in such a way as to change the level of the display image 30 on the monitor TV set 12 to an adequate level.

This correcting action is initiated with a signal indicating the selection of a manual operation given to the control unit 14 through the selecting operation signals MOA by shifting the switching position of the auto/manual selection part 200 to a manual operation position. After that, the iris operation part 130 is operated to give an iris operation signal OP which carries an instruction for opening or stopping down the aperture of the iris to the control unit 14. Upon receipt of the iris operation signal OP, the control unit 14 generates a command corresponding to the signal OP. This command is sent to the control unit 6 of the corresponding remote station 11 via the communication control part 19, the station line 18 and the communication control part 7. The control unit 6 interprets the command and sends a signal to the up-count instruction output terminal U if the command is for opening the iris or to the down-count instruction output terminal D if the command is for stopping down the iris. This signal is sent out to the up-count instruction input terminal UP or the down-count instruction input terminal DN of the presettable up/down counter 15. The presettable up/down counter 15 then increases or decreases the data output from the reference data output terminal DO in synchronism with the count pulses applied to the count pulse input terminal CLK from the count pulse output terminal CP of the control unit 6. As a result, the reference data coming to the reference data input terminal CD of the data comparison circuit 17 becomes either larger or smaller than the detection data coming to the detection input terminal LD of the data comparison circuit 17. Therefore, to the iris control circuit 50 is supplied the opening driving signal O or the stopping-down diving signal C. The current position of the iris of the photo-taking lens 201 is then corrected in the direction of opening or stopping down the aperture.

Figure 3C:
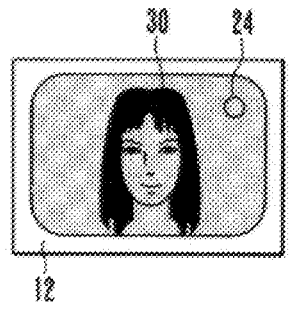

When the iris of the photo-taking lens 201 is adequately under automatic control, the display image 30 is obtained in an adequate exposure state as shown in FIG. 3(A). However, in a case where a light source image 24 of an illumination light brought into the display image plane by the facing direction of the video camera disposed at a video conference room or the like as shown in FIG. 3(B), the iris is automatically controlled to obtain an adequate level for the image plane as a whole. The automatic control then causes the display image 30 to become too dark. Under such a condition, therefore, the auto/manual selection part 200 is operated to select the manual operation. The manual operation is performed on the iris operation part 130 to give an instruction for opening the iris in such a way as to correct the brightness of the display image 30 to an adequate level. As a result, the aperture position of the iris of the photo-taking lens 201 is shifted toward its full open position. The display image 30 on the monitor TV set 12 gradually becomes brighter. The iris opening operation which is performed on the iris operation part 130 on the side of the home station 10 is stopped when the brightness of the display image 30 becomes adequate as shown in FIG. 3(C).

Figure 3D:
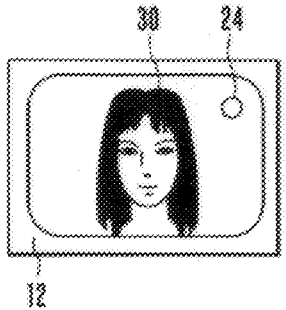
Figure 3E:
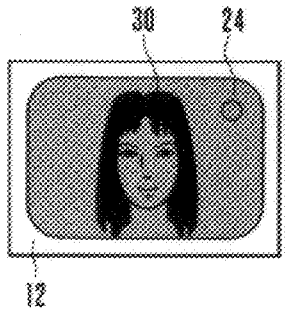
Figure 3F:
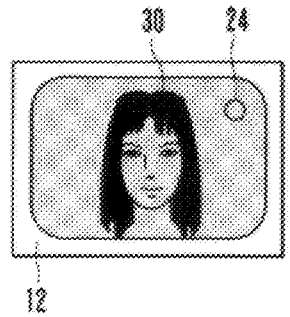

The image 30 displayed at this point of time on the monitor TV set 12 is obtained with the iris of the photo-taking lens 201 in an apposite open position. However, a considerable length of time is necessary before the video image picked up by the video camera 1 comes to be displayed on the monitor TV set 12 after the processes of coding by the moving-image codec 8, sending the image to the station line 18 through the communication control part 7, receiving the image through the communication control part 19 and decoding the image by the moving-image codec 9. This delay time is determined by the speed of transmission through the station line 18, the coding and decoding methods of the moving-image codecs 8 and 9, etc. Generally, however, the delay time is about 0.5 sec with the speed of the station line 18 assumed to be about 64 kbps. In other words, by the time when the brightness of the display image 30 becomes as shown in FIG. 3(C), the iris opening action on the photo-taking lens 201 has further progressed and, depending on the speed of the iris opening action, the iris is considerably further opened from the apposite open position. As a result, when the iris opening operation on the iris operation part 130 is stopped upon confirmation of the state of the display image 30 on the monitor TV set 12 as shown in FIG. 3(C), the iris of the photo-taking lens 201 is actually set in an excessively open position. As a result, therefore, the display image 30 eventually becomes brighter than the adequate brightness as shown in FIG. 3(D).

However, when the iris operation signal OP from the iris operation part 130 is stopped from being sent out, the stop of the signal OP is transmitted from the control unit 14 to the control unit 6 of the remote station 11 through the communication control part 19, the station line 18 and the communication control part 7. With the iris operation coming to a stop in this manner, the control unit 6 sends out an instruction from its data select instruction output terminal SEL to the data selector 220 to select the input terminal A. With the input terminal A selected, the data output from the level delay output terminal DLD of the data delay circuit 16 is given to the preset data input terminal DI of the presettable up/down counter 15. After this, the control unit 6 sends out an instruction from the data preset instruction output terminal S to the data preset instruction input terminal PSET of the presettable up/down counter 15 to instruct the counter 15 to preset the input data received at the preset data input terminal DI. By this, level data which comes from the level detector 40 and has been delayed by the data delay circuit 16 is given to the presettable up/down counter 15.

In this instance, the amount of delay given to the data delay amount instruction input terminal DL of the data delay circuit 16 via the data delay amount instruction output terminal DLO of the control unit 6 corresponds to a length of time obtained by adding a length of time which is required before the data output of the data delay circuit 16 is set at the presettable up/down counter 15 after the control unit 6 is informed of the stop of the iris operation signal OP to a length of time necessary before the video signal from the video camera 1 is reflected by the display image on the monitor TV set 12 after the video signal is coded by the moving-image codec 8, transmitted via the communication control part 7, the station line 18 and the communication control part 19 and decoded by the moving-image codec 9. In other words, the data sent out to the level delay output terminal DLD through the data delay circuit 16 represents the level of the video signal corresponding to the picture displayed on the monitor TV set 12 on the side of the home station 10.

Therefore, with the level delay output (DLD) from the data delay circuit 16 preset at the presettable up/down counter 15, data necessary for obtaining a video image at an exposure level as shown in FIG. 3(C) is given to the reference data input terminal CD of the data comparison circuit 17 as a reference value. As a result, the input value of the detection data input terminal LD of the data comparison circuit 17 becomes larger than the input value of the reference data input terminal CD. Then, to correct the difference, a control signal for stopping down the iris of the photo-taking lens 201 is supplied from the stopping-down driving signal terminal C to the iris control circuit 50. The iris of the photo-taking lens 201 is then controlled to correct the state of exposure from the state of FIG. 3(D) to a state of FIG. 3(F), so that an exposure level desired on the home station 10 can be obtained.

While the embodiment has been described by way of example as operating to shift the position of the iris toward its full open position for increasing the exposure level of the video camera 1, an iris stopping-down operation of the embodiment of course can be accomplished in exactly the same manner. This invention is likewise applicable also to a system where the level of the video signal is arranged to be electrically variable.

In the case of the embodiment described, the data delay circuit 16, the presettable up/down counter 15, the data comparison circuit 17, the data selector 220, etc., are arranged, by way of example, as discrete elements separately from the control unit 6. However, the control unit 6 of course can be arranged to include therein all the functions of these elements. In that instance, these functions can be covered by some software arrangement. It is of course also possible to arrange other functions of the video camera 1 such as panning, tilting and zooming to be simultaneously carried out under similar control in combination with the arrangement described.

As described above, according to the arrangement of this embodiment, in a case where the system having a time difference between sending out a video image and displaying the image is to be manually operated while watching the picture displayed, on the side of displaying the video image, to vary or adjust the panning, tilting and zooming positions of the video camera, the panning, tiling and zooming positions obtained when the manual operation is stopped are corrected according to the time difference. Therefore, despite the delay of display due to the moving image coding, transmitting and decoding processes, the facing direction and/or the zooming position of the video camera can be automatically adjusted to a desired position without any overrun.

Further, the arrangement of the embodiment is such that, in a case where the system having a time difference between sending out a video image and displaying the image is to be manually operated while watching the image on the side of displaying the video image, the state of the iris obtained when the manual operation comes to a stop is corrected according to this time difference. Therefore, despite a display delay due to the moving-image coding, transmitting and decoding processes, the video image level is adjustable as desired by the operator while watching the display image.

Figure 8:
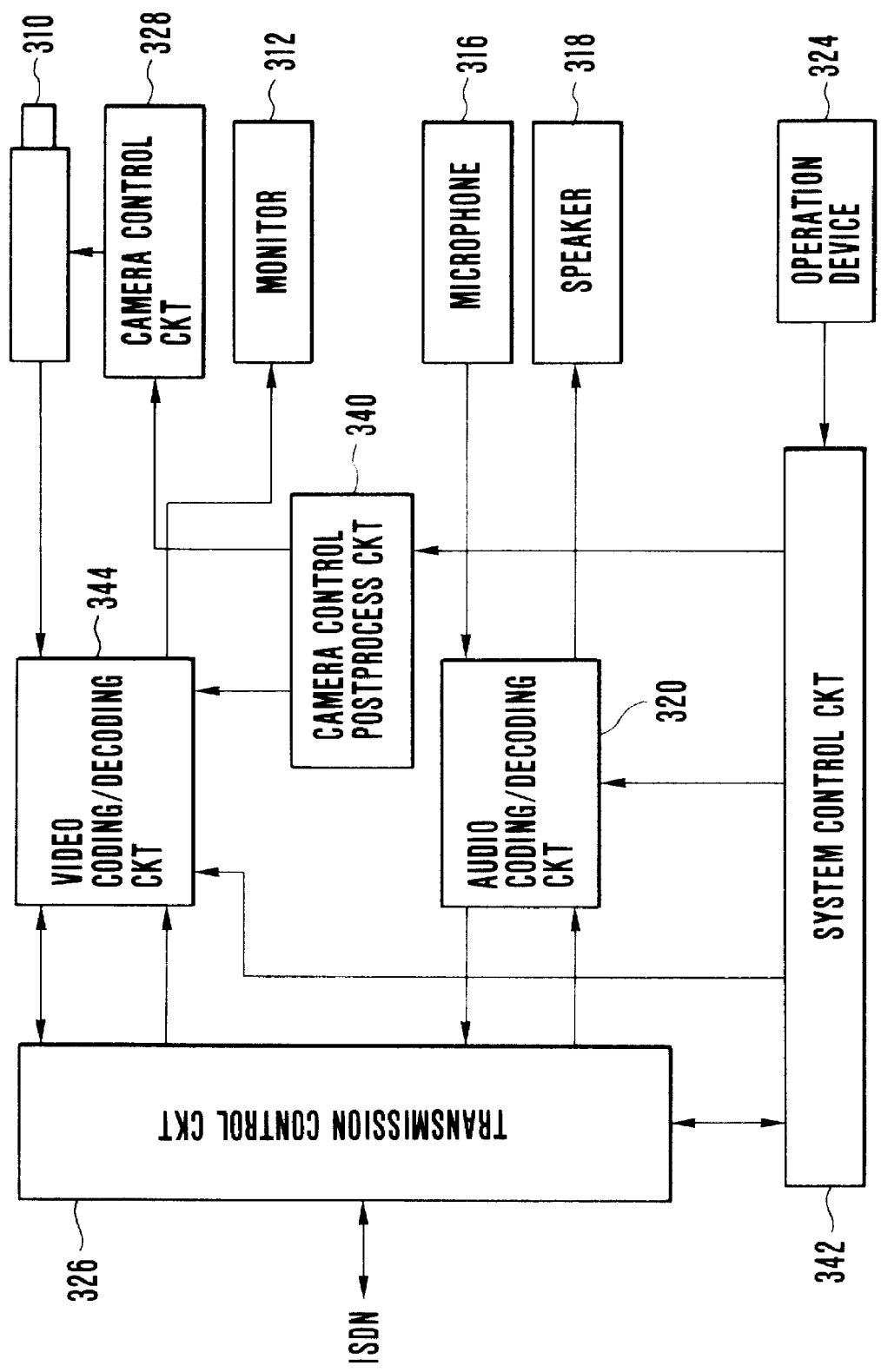
FIG. 8 is a block diagram showing an improved arrangement of the embodiment of this invention as applied to a terminal unit of a video conference system.

Another embodiment of this invention which is an improvement over the above-stated embodiment is described as follows with reference to FIG. 8:

Referring to FIG. 8, a video camera 310 is set to pickup images of participants in a conference. A monitor 312 is arranged to display video images picked up at a home station and a corresponding remote station (hereinafter referred to as a remote station) on an image plane either by switching one over to another or by separately showing them on the image plane. A video coding/decoding circuit 344 which is called "codec" for short is arranged to code the output of the video camera 310 and to decode a coded video signal received from the remote station. A microphone 316 is provided for an audio input. A speaker 318 is provided for an audio output. An audio coding/decoding circuit 320 is arranged to code an audio signal coming from the microphone 316 and to decode a coded audio signal received from the remote station.

A system control circuit 342 is arranged to control the whole system. An operation device 324 is arranged to input predetermined instructions to the system control circuit 342. A transmission control circuit 326 is arranged to conduct communication with the remote station. A camera control postprocess circuit 340 is arranged to perform reversing control to an extent corresponding to the amount of the delay mentioned in the foregoing. A camera control signal from the system control circuit 342 is applied through this camera control postprocess circuit 340 to a camera control circuit 328. The camera control postprocess circuit 340 is further arranged to supply a freeze control signal to the video coding/decoding circuit 344 for a period of time during which the reverse control is performed. Further, the camera control circuit 328 is arranged to control the panning, tilting and zooming actions on the video camera 310 in accordance with an instruction received from the system control circuit 342 through the camera control postprocess circuit 340.

The video camera 310 picks up the images of participants in the conference. The video signal outputted from the video camera 310 is supplied to the transmission control circuit 326 after a high-efficiency compression coding process is carried out on the video signal by the video coding/decoding circuit 344. Further, the voices of the participants in the conference are inputted to the microphone 316. The output of the microphone 326 is supplied to the transmission control circuit 326 after a coding process carried out by the audio coding/decoding circuit 320. The system control circuit 342 applies the transmission control circuit 326 with data to be transmitted to the remote station and also a command for control over the terminal device of the remote station.

The transmission control circuit 326 rearranges, in accordance with a given format, information to be transmitted to the remote station from the video coding/decoding circuit 344, the audio coding/decoding circuit 320 and the system control circuit 342. The information rearranged is sent to a communication line.

Further, the transmission control circuit 326 divides information received from the remote station via the communication line into image information, audio information, data and a control command and supplies them respectively to the video coding/decoding circuit 344, the audio coding/decoding circuit 320 and the system control circuit 342. The video coding/decoding circuit 344 then decodes the coded video signal received from the remote station and supplies it to the monitor 312. The audio coding/decoding circuit 320 decodes the coded audio signal received from the remote station and supplies it to the speaker 318.

In response to an operation on the operation device 324 and a control command coming from the remote station, the system control circuit 342 controls the video image coding/ decoding circuit 344 and the audio coding/decoding circuit 320 and also controls the video camera 310 through the camera control circuit 328. The video camera 310, the video coding/decoding circuit 344 and the audio coding/decoding circuit 320 disposed at the home station of course can be controlled by operating the operation device 324.

Figure 9:
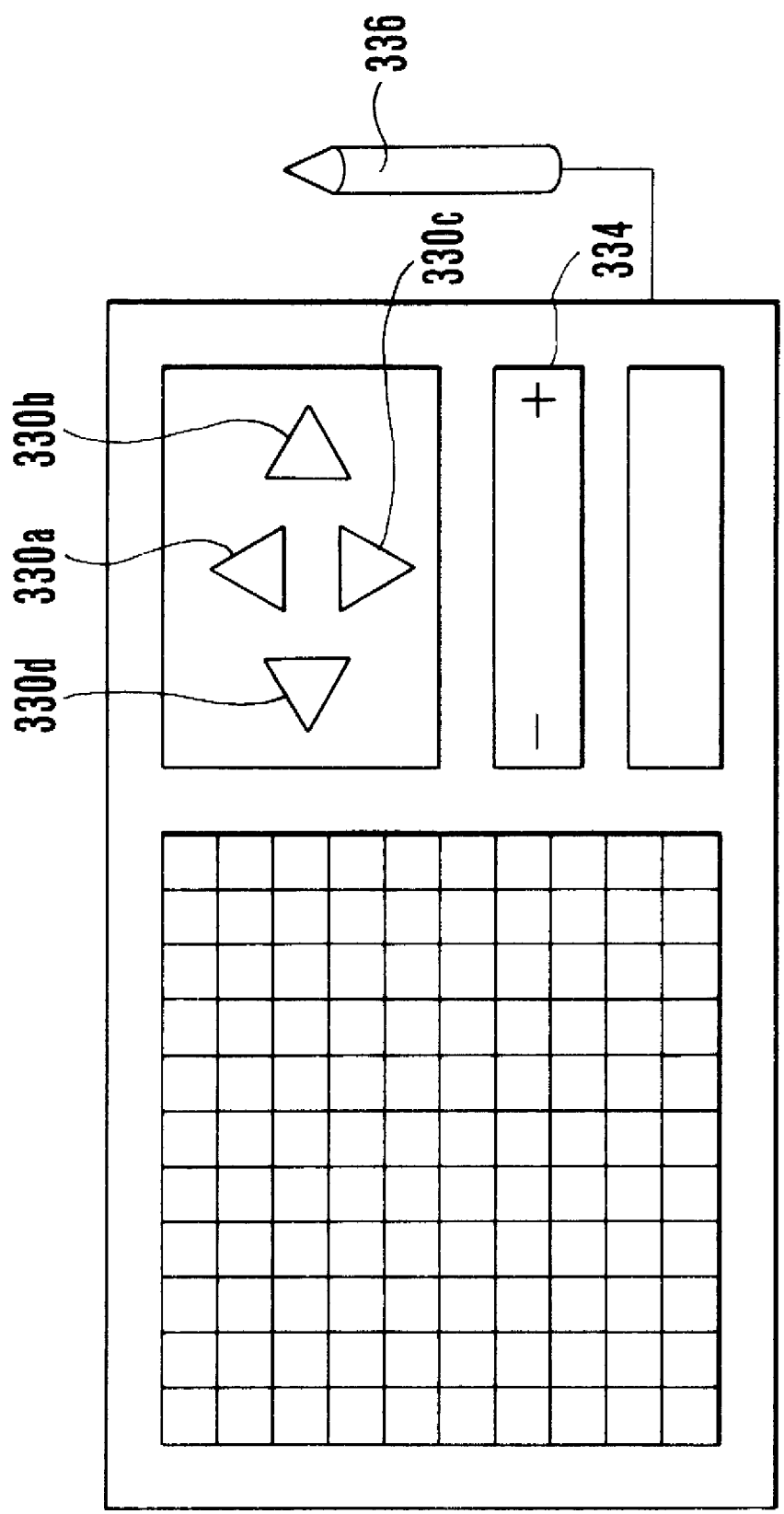
FIG. 9 shows the surface of an operation panel of an operation device 324 shown in FIG. 8.

With respect to the operation device 324, an input device such as a digitizer can be used. Referring to FIG. 9, on an operation panel, there are provided four-way switches 330a, 330b, 330c and 330d for panning and tilting and a two-way switch 334 for zooming in the "+" and "−" directions. These switches 330a, 330b, 330c, 330d and 334 are operable with an input pen 336. For example, the switch 330a is operated to instruct the system control circuit 342 for upward tilting, the switch 330c for downward tilting, the switch 330b for rightward panning, the switch 330d for leftward panning, the "+" side of the switch 334 for a zoom-in action and the "−" side of the switch 334 for a zoom-out action.

As long as any of these switches 330a, 330b, 330c, 330d and 334 is being pushed by the input pen 336, the operation device 324 continuously supplies a control signal corresponding to the operation to the system control circuit 342. In a case where the video camera of the home station is to be controlled, the system control circuit 342 supplies a control signal to the camera control circuit 328 via the camera control postprocess circuit 340. If the video camera of the remote station is to be controlled, the system control circuit 342 sends a control command to the remote station via the transmission control circuit 326. The camera control circuit 328 controls the panning, tilting or zooming action of the video camera 310 in accordance with the control signal from the system control circuit 342.

For example, in panning the video camera of the home station to the right, the operation device 324 continuously supplies an applicable control signal to the system control circuit 342 as long as the switch 330b is pushed by the input pen 336. Under this condition, the system control circuit 342 continues to supply a rightward panning control signal to the camera control circuit 328. As long as the rightward panning control signal input continues, the camera control circuit 328 continues to pan the video camera 310 to the right. The effect of panning is confirmable by causing the monitor 312 to display a video image thus obtained at the home station. When the video camera has been moved to a desired extent, the input pen 336 is detached from the switch 330b. Leftward panning, tilting and zooming can be likewise carried out.

In a case where the video camera of the remote station is to be controlled, the system control circuit 342 sends a camera control command to the remote station. The effect of operation on the video camera then can be confirmed by causing the a monitor 312 to make a display of a resultant video image received from the remote station. The camera operating instruction input can be brought to a stop at the operation device 324 by detaching the input pens 336 from the switch 330a, 330b, 330c, 330d or 334.

Figure 10:
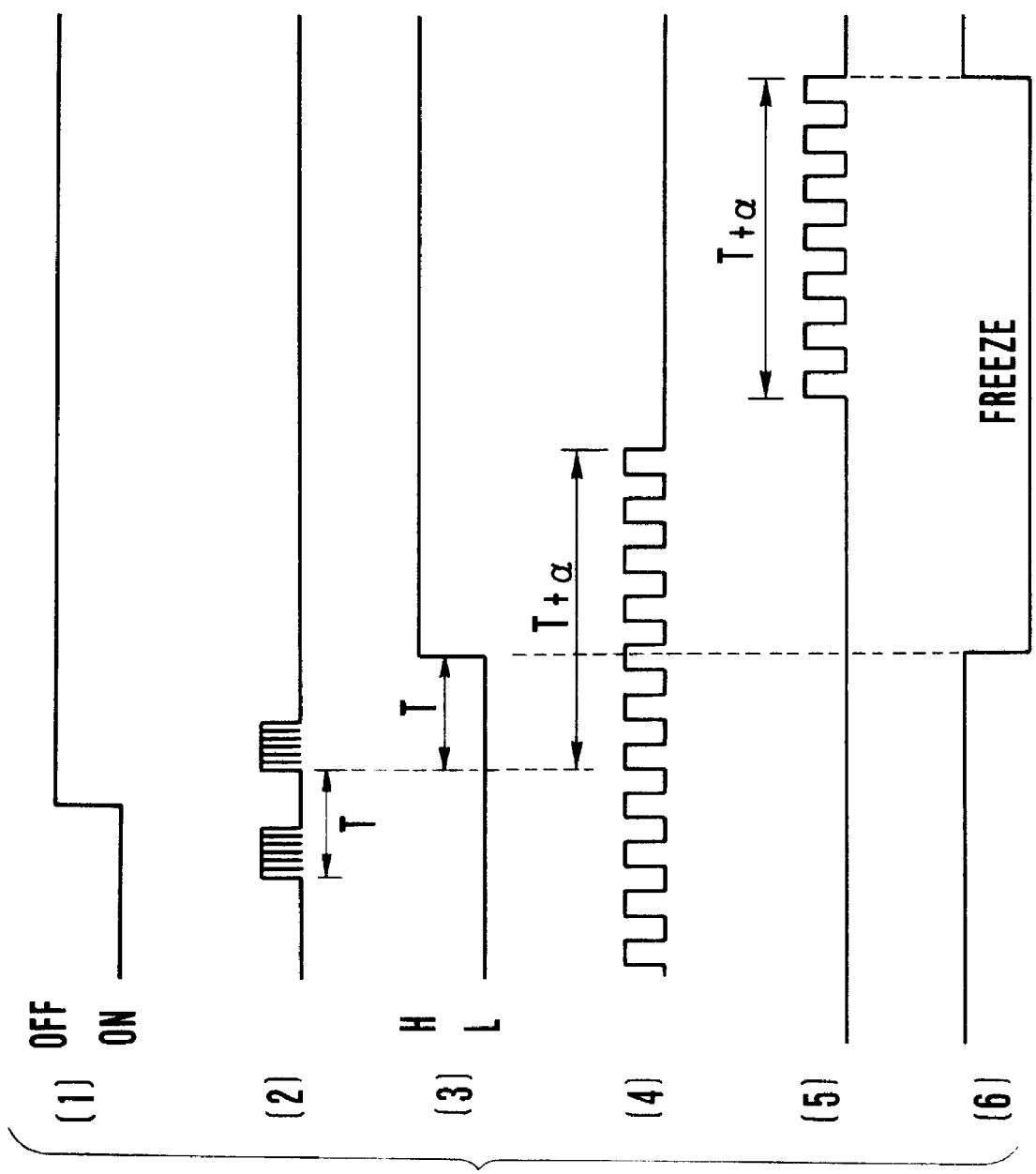
FIG. 10 is a timing chart showing a panning operation of the embodiment shown in FIG. 8.

FIG. 10 is a timing chart showing the timing of operation of the embodiment shown in FIG. 8. The action of the camera control postprocess circuit 340 is described in detail with reference to FIG. 10. In FIG. 10, a part (1) shows, for example, the on/off state of the left panning switch 330d. A part (2) shows a code signal which is supplied from the operation device 324 to the system control circuit 342 indicating an on-state of the switch 330d. For a period of time during which the switch 330d is on, the operation device 324 continues to output the code signal in a cycle of a period T. When the switch 330d turns off, the operation device 324 stops outputting the code signal either at the same time as or shortly after the turning off of the switch 330d.

If the code signal which is shown at the part (2) of FIG. 10 fails to come after the lapse of the period of time T from the last input of it, the system control circuit 342 causes the left panning control signal which is shown at a part (3) of FIG. 10 to have a high level H. The left panning control signal is applied to the camera control circuit 328 through the camera control postprocess circuit 340. In response to the change in the left panning control signal, the camera control circuit 328 stops supplying a panning motor (not shown) with a driving pulse signal for driving the panning motor in the direction of leftward panning after the lapse of a delay time (T+α) from the turning-off of the switch 330d, as shown at a part (4) in FIG. 10.

In response to the change from a low level L to a high level H of the left panning control signal supplied from the system control circuit 342, the camera control postprocess circuit 340 instructs the video coding/decoding circuit 344 to freeze a monitor display image, which represents an image picked up at the home station when the video camera 310 of the home station is operated or an image picked up at the remote station when the video camera of the remote station is operated. A part (6) of FIG. 10 shows such as freeze instruction. In accordance with the freeze instruction, the monitor display image is frozen by the video coding/ decoding circuit 344 to give to the monitor 312 a still image display of an image obtained when the switch 330d is turned off.

Further, in response to the change from the low level L to the high level H of the left panning control signal from the system control circuit 342, the camera control postprocess circuit 340 also generates a right panning control signal for panning in the reverse direction and applies it to the camera control circuit 328 for a preset period of time (T+α). In response to this signal, the camera control circuit 328 generates right panning driving pulses for a period of time (T+α) as shown at a part (5) in FIG. 10. As a result, the video camera 310 is moved back to its position obtained when the switch 330d is turned off.

After completion of the reverse moving (return) control, the camera control postprocess circuit 340 cancels the freeze instruction given to the video coding/decoding circuit 344. In response to this, the video coding/decoding circuit 344 supplies either an image picked up at the home station or an image from the remote station to the monitor 312 as a moving image.

The period of time (T+α) or the amount of the reverse moving control and the period of freezing can be accurately predetermined according to the component elements employed. These values thus can be appositely preset at the camera control postprocess circuit 340. While the left panning operation has been described, a right panning operation can be carried out in the same manner. Other control operations for aperture adjustment, focusing, etc., can be carried out also in the same manner. Further, in the event of operating the video camera disposed at the remote station, the time (T+α) or the amount of the reverse moving control and the freezing period can be set by adding a length of time required for the processes of transmitting the control command and receiving the image picked up at the remote station.

In the case of this embodiment, the delay of the operation on the camera is arranged to be offset by a postprocess and the monitor image display is frozen during the postprocess, so that the movement of camera can be brought to a stop at any camera position as desired.

Figure 11:
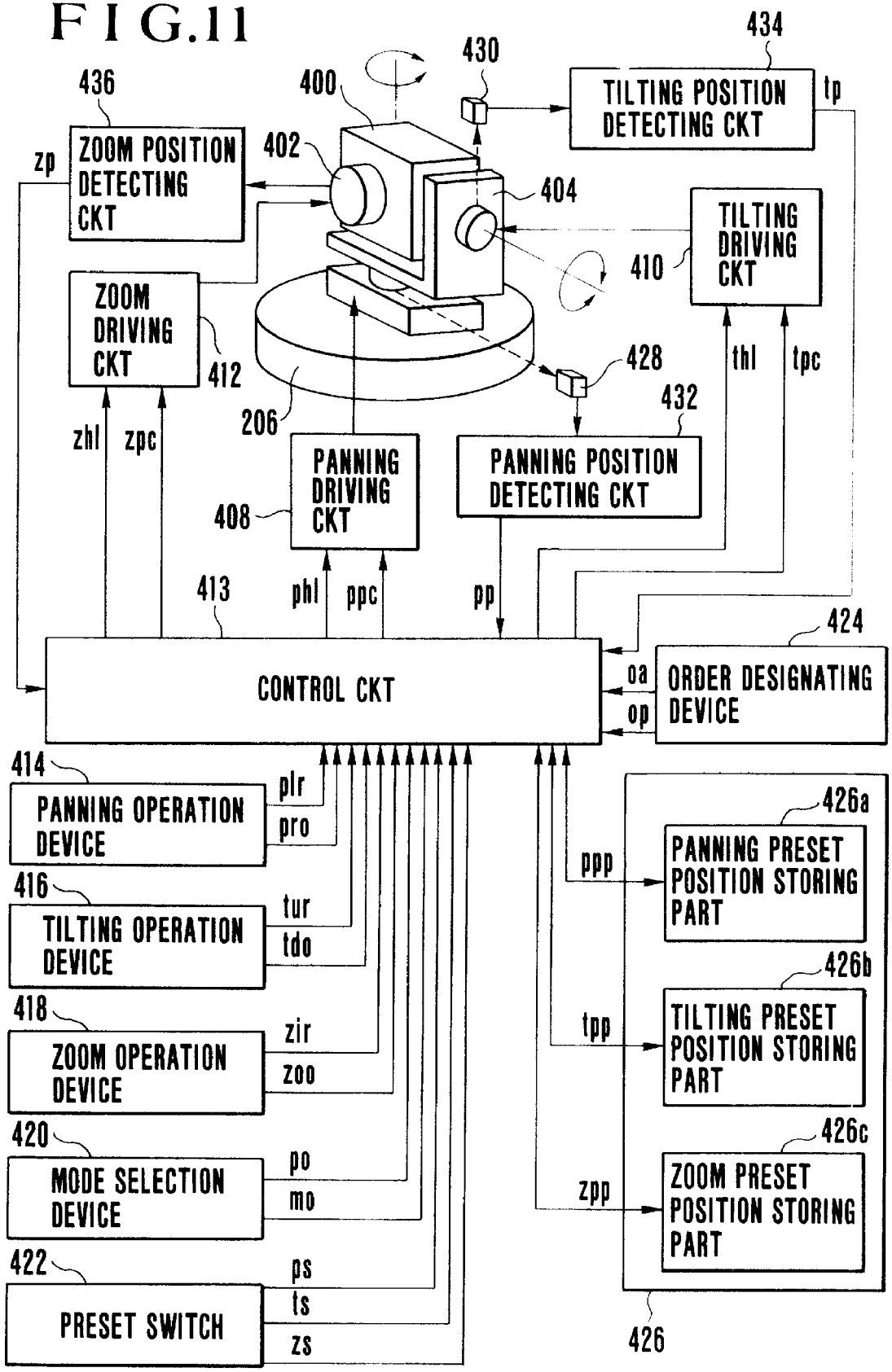
FIG. 11 is a block diagram showing in outline the arrangement of a camera control system arranged according to this invention as an embodiment thereof.

Next, a further improvement on the embodiment is described as a further embodiment of this invention:

FIG. 11 shows in a block diagram the arrangement of the improved embodiment. The illustration includes a video camera 400 and a motor-driven zoom lens 402. The video camera 400 is mounted on a base 406 through a panning and tilting driving device 404. The panning and tilting driving device 404 is provided with a panning motor for swinging the video camera 400 within a horizontal plane and a tilting motor for swinging the video camera 400 within a vertical plane. A panning driving circuit 408 is arranged to drive the panning motor. A tilting driving circuit 410 is arranged to drive the tilting motor. A zoom driving circuit 412 is arranged to drive the zoom lens 402 in the direction toward its telephoto end position or toward its wide-angle end position. A control circuit 413 is arranged to control the whole system of this embodiment and particularly the panning driving circuit 408, the tilting driving circuit 410 or the zoom driving circuit 412 according to an operation performed by the operator on the system. The control circuit 413 will be described in detail later.

A preset position memory 426 is arranged to store therein preset positions relative to panning, tilting and zooming separately from each other. An angle sensor 428 is arranged to detect the panning angle (or position) of the panning/tilting driving device 404. An angle sensor 430 is arranged to detect the tilting angle (or position) of the panning and tilting driving device 404. A panning position detecting circuit 232 is arranged to convert the output of the angle sensor 428 into a digital value within a given range or a voltage signal. A tilting position detecting circuit 434 is arranged to convert the output of the angle sensor 430 into a digital value within a given range or a voltage signal. A zoom position detecting circuit 436 is arranged to detect the zoom position of the zoom lens 402 and to output a digital value within a given range or a voltage signal. The output of each of these detecting circuits 432, 434 and 436 is applied to the control circuit 413.

This embodiment has a manual mode in which the video camera 400 is manually operated and a preset mode in which the camera 400 is controlled to be set in a preset position designated. A mode selection device 420 is arranged to enable the operator to instruct the control circuit 413 to operate in the manual mode or in the preset mode by operating the mode selection device 420. The mode selection device 420 outputs and supplies a manual mode setting signal "mo" to the control circuit 413 when the manual mode is selected and a preset mode setting signal "po" when the preset mode is selected.

Each of a panning operation device 414, a tilting operation device 416 and a zoom operation device 418 is composed of a switch which permits selection of two ways. These selection devices permit operations to designate the directions of panning, tilting and zooming in the manual mode and to designate either the forward direction or the backward direction of change-over from one preset position to another in the preset mode.

More specifically, the panning operation device 414 is arranged to supply a left/backward panning operation signal "plr" or a right/forward panning operation signal "pro" to the control circuit 413. The tilting operation device 416 is arranged to supply an up/backward tilting operation signal "tur" or a down/forward tilting operation signal "tdo" to the control circuit 413. The zoom operation device 418 is arranged to supply either a zoom-in/backward zooming operation signal "zir" or a zoom-out/forward zooming operation signal "zoo" to the control circuit 413.

A preset switch 422 is arranged to permit registering the preset position of a panning, tilting or zooming control element in the manual mode and to designate a shift to the preset position relative to the control element in the preset mode. The preset switch 422 supplies the control circuit 413 with a panning designation signal "ps" when panning is selected, a tilting designation signal "ts" when tilting is selected and a zoom selection signal "zs" when zooming is selected.

An order designating device 424 is arranged to designate whether the preset positions registered in the memory 426 is to be read out in the order of registration or in the order of addresses in the preset mode. The order designating device 424 supplies the control circuit 413 with a preset order designating signal "op", if the reading is to be made in the order of registration, or with an address order designating signal "oa" in the case of reading in the order of addresses.

The driving circuits 408, 410 and 412 are capable of generating driving signals at high and low speeds. The control circuit 413 is capable of controlling these driving speeds by control signals "phl", "thl" and "zhl".

In the manual mode, the embodiment permits presetting positions to be registered in the preset position memory 426 individually for panning, tilting and zooming. Designation as to which of the current positions of camera control elements provided for panning, tilting and zooming is to be registered in the preset position memory 426 can be made by using the preset switch 422. In the preset mode, the camera control elements for panning, tilting and zooming can be individually moved to their preset positions registered in the preset position memory 426. Designation of any of the preset positions registered for panning, tilting and zooming to which the applicable camera control element is to be moved can be made by using the preset switch 422.

Figure 12:
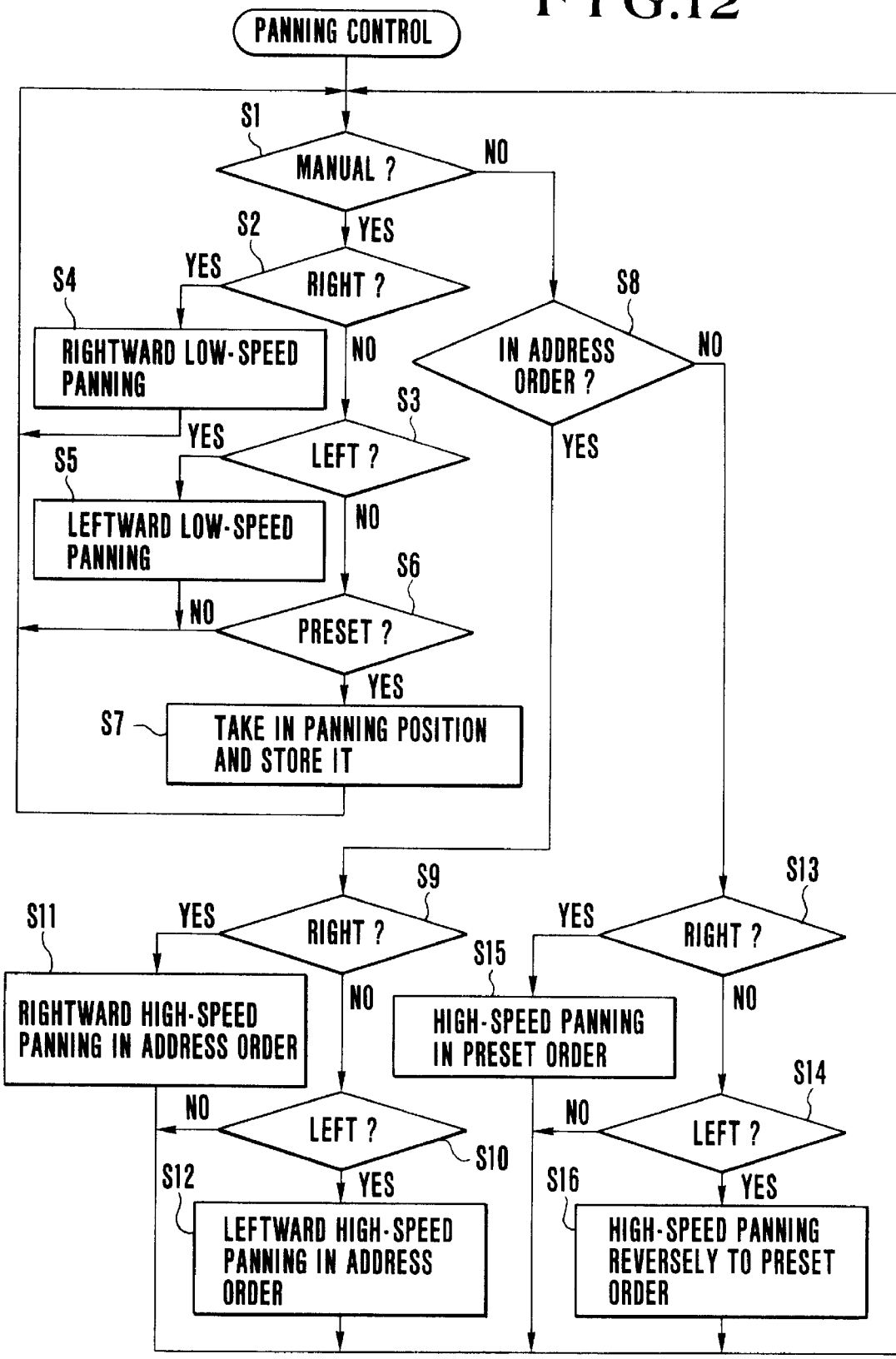
FIG. 12 is a flow chart showing the panning control operation of the embodiment shown in FIG. 11.

The following describes the panning control operation of the embodiment with reference to FIG. 12 which shows the flow of this operation: a preset position must be first registered in the preset position memory 426. Therefore, the manual mode is designated by using the mode selection device 420 in general. The mode selection device 420 then outputs a manual mode setting signal "mo" to bring the control circuit 413 into the manual mode.

At a step S1, the control circuit 413 monitors the output of the panning operation device 414 in the manual mode. The panning operation device 414 outputs a right/forward panning operation signal "pro" when rightward panning is designated by the operator or a left/backward panning operation signal "plr" when leftward panning is designated.

At a step S2, in the case of the right/forward panning operation signal "pro", the flow comes to a step S4. At the step S4, the control circuit 413 instructs the panning driving circuit 408 to make rightward panning with a panning position driving signal "ppc" and to drive at a low speed with a panning speed designation signal "phl". In response to these signals, the panning driving circuit 408 causes the panning/tilting driving device 404 to pan the video camera 400 to the right at a low speed.

At a step S3, in the event of the left/backward panning operation signal "plr", the flow comes to a step S5. At the step S5, the control circuit 413 instructs the panning driving circuit 408 to make leftward panning with the panning position driving signal "ppc" and to drive at a low speed with the panning speed designation signal "phl". In response to these signals, the panning driving circuit 408 causes the panning/tilting driving device 404 to pan the video camera 400 to the left at a low speed.

In the manual mode, as mentioned above, the current camera position can be registered as a preset position in the preset position memory 426 by operating the preset switch 422. The preset switch 422 outputs a panning position preset designation signal "ps" when the operator designates panning by operating the preset switch 422, a tilting position preset designation signal "ts" when tilting is designated, and a zoom position preset designation signal "zs" when zooming is designated by the operator.

At a step S6, since the flow of panning control is described here, a panning operation is assumed to have been designated. In response to the panning position preset designation signal "ps" coming from the preset switch 422, the flow comes to a step S7. At the step S7, the control circuit 413 takes in the output of the panning position detecting circuit 432 which is a panning position signal "pp". The panning position signal "pp" is stored in a panning preset position storing part 426a of the preset position memory 426 including data which indicates the order of presetting and tilting and zooming position information (address information).

In a case where tilting is designated by the preset switch 422, the control circuit 413 takes in the output of the tilting position detecting circuit 434 which is a tilting position signal "tp". The tilting position signal "tp" is stored in a tilting preset position storing part 426b of the preset position memory 426 including data which indicates the order of presetting and panning and zoom position information (address information). If zooming is designated by the preset switch 422, the control circuit 413 likewise takes in the output of the zoom position detecting circuit 436 which is a zoom position signal "zp". The zooming position signal "zp" is then stored in a zoom preset position storing part 426c of the preset position memory 426 including data which indicates the order of presetting and panning and tilting position information (address information).

The preset mode can be advantageously utilized after each of the camera positions has been preset in the above-stated manner. When the preset mode is designated by the mode selection device 420, the mode selection device 420 supplies a preset mode setting signal "po" to the control circuit 413. In response to the preset mode setting signal "po", the mode of the control circuit 413 becomes the preset mode. Then, control over the shift of the camera position to a preset position is performed in the order designated by the order designating device 424.

In changing a panning, tilting or zooming position over to another position, the order designating device 424 designates whether the change is to be effected in the order of presetting or in the order of coordinates adjoining the current position (the order of addresses).

In the case of shifting the position in the order of addresses, the panning operation device 414 enables the operator to designate either the order of addresses or an order reverse to it. If the shifting is in the order of presetting, the panning operation device 414 enables the operator to designate either shifting in the presetting order or in an order reverse of it.

In the preset mode, the flow comes to a step S8.

At the step S8, a check is made to find if the panning is to be made in the order of addresses. If so, the flow comes to a step S9. At the step S9, if the right/forward panning operation signal "pro" is obtained from the panning operation device 414, the flow comes to a step S11. At the step S11, the control circuit 413 reads out preset position data "ppp" which is nearest to the current position on the right side from the panning preset position storing part 426a of the preset position memory 426 and controls the panning driving circuit 408 in such a way as to cause the video camera 400 to be panned (moved by panning) at a high speed to the panning preset position.

In other words, the control circuit 413 supplies a panning position driving signal "ppc" for right panning to the panning driving circuit 408 until the panning position output from the panning position detecting circuit 432 becomes equal to the panning preset position read out from the panning preset position storing part 426a of the preset position memory 426. In this instance, the panning driving circuit 408 is instructed to pan at a high speed by a panning driving speed designation signal "phl".

At a step S10, in response to a left/backward panning operation signal "plr" from the panning operation device 414, the flow comes to a step S12. At the step S12, the control circuit 413 reads out preset position data "ppp" which is nearest to the current position on the left side thereof from the panning preset position storing part 426a of the preset position memory 426. The control circuit 413 then controls the panning driving circuit 408 to cause the video camera 400 to be panned at a high speed to the panning preset position. In other words, the control circuit 413 supplies a panning position driving signal "ppc" for leftward panning to the panning driving circuit 408 until the panning position output from the panning detecting circuit 432 becomes equal to the panning preset position read out from the panning preset position storing part 426a of the preset position memory 426. In that instance, the panning driving circuit 408 is instructed to move the video camera 400 at a high driving speed by the panning driving speed designation signal "phl".

If the result of the check made at the step S8 indicates the order of presetting, the flow comes to a step S13. At the step S13, the flow comes to a step S15 if the right/forward panning operation signal "pro" comes from the panning operation device 414. At the step S15, the control circuit 413 reads out next preset position data "ppp", in the order of presetting, from the panning preset position storing part 426a of the preset position memory 426. The panning driving circuit 408 is controlled to cause the video camera 400 to be panned at a high speed to the applicable panning preset position. In other words, the control circuit 413 continuously supplies the panning position driving signal "ppc" to the panning driving circuit 408 until the panning position output from the panning position detecting circuit 432 becomes equal to the panning preset position read out from the panning preset position storing part 426a of the preset position memory 426. The panning driving circuit 408, in this instance, is instructed by the panning driving speed designation signal "phl" to make high speed driving.

If the result of check made at the step S13 is found to be not rightward panning, the flow comes to a step S14 to make a check for the left/backward panning operation signal "plr". If the signal "plr" is found at the step S14, the flow comes to a step S16. At the step S16, the control circuit 413 reads preset position data "ppp" which is located immediately before the current position in the order of presetting from the panning preset position storing part 426a of the preset position memory 426. The panning driving circuit 408 is then controlled to cause the video camera 400 to be panned at a high speed.

In other words, the control circuit 413 continuously supplies the panning position driving signal "ppc" for the applicable panning direction to the panning driving circuit 408 until the panning position output from the panning position detecting circuit 432 becomes equal to the panning preset position read out from the panning preset position storing part 426a of the preset position memory 426. In that instance, the panning driving circuit 408 is instructed by the panning driving speed designation signal "phl" to perform high speed driving.

The embodiment shown in FIG. 11 is arranged to be capable of controlling each of the panning, tilting and zooming control elements to individually shift the position of the video camera to a preset position at a high speed. Besides, shifting to the preset position can be selectively made between a mode of shifting to a near position or a mode of shifting in the order of presetting of the positions. Therefore, the facing direction of the video camera can be quickly shifted from one participant in the conference over to another, for example, in some specific desired sequence or in the order of seats. While the operation for shifting to the preset position has been described for panning by way of example, tilting and zooming can be carried out in the same manner.

Figure 13:
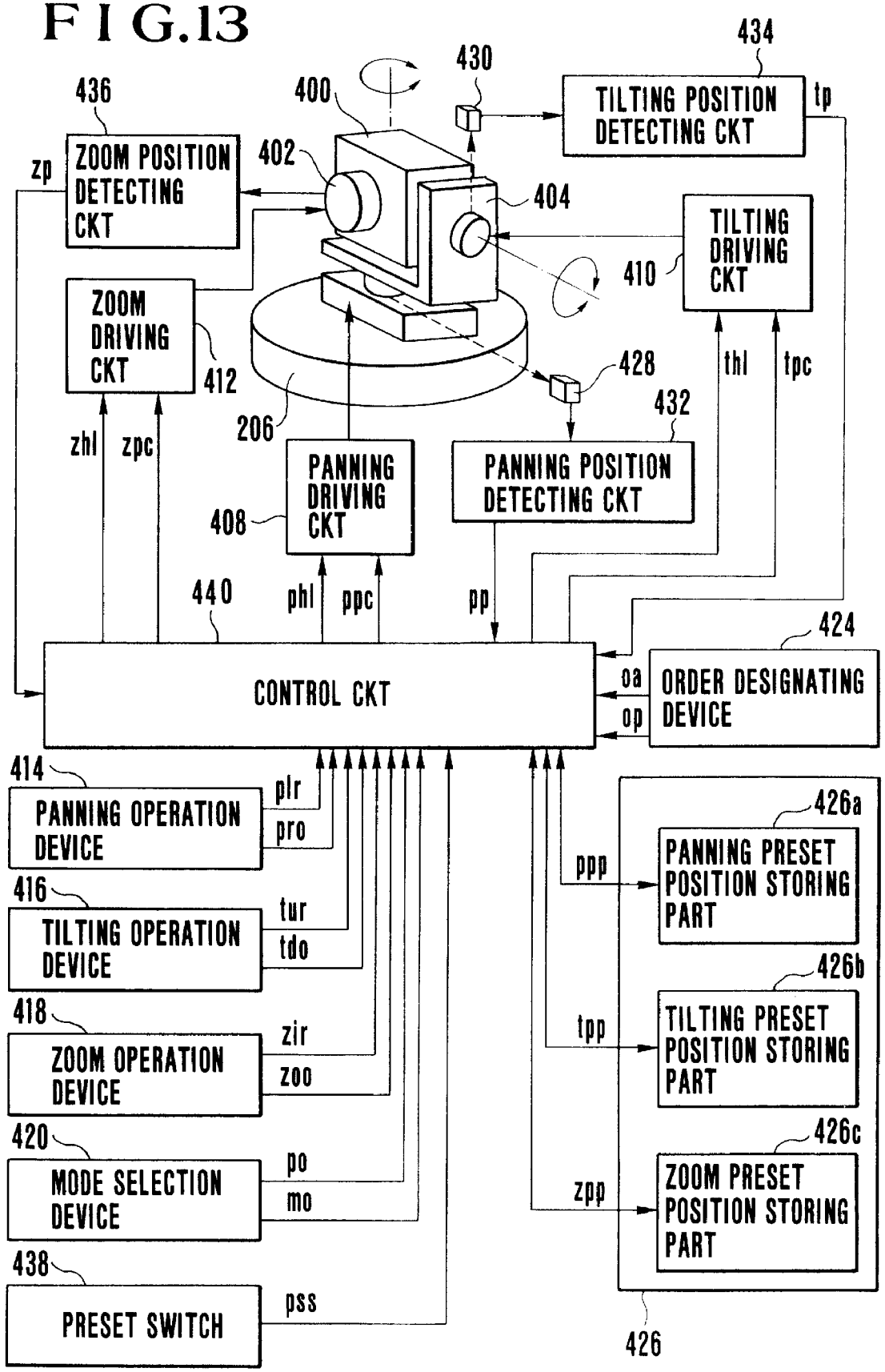
FIG. 13 is a block diagram showing in outline a camera control system arranged as a first example of modification of the embodiment shown in FIG. 11.

With the embodiment arranged as shown in FIGS. 11 and 12, the panning, tilting and zooming positions can be individually preset and the shift to each of the preset positions for panning, tilting and zooming is individually controllable. However, this arrangement can be modified, for example, in the following manner: a panning position is registered as a basic position. Then, tilting and zooming positions obtained at the time of registering the panning position are registered in the preset position memory 426 as preset positions together with the panning position. Such modification permits control over panning, tilting and zooming together. FIG. 13 is a block diagram showing by way of example the arrangement of such modification.

Referring to FIG. 13, a preset switch 438 is arranged to output a preset signal "pss" when this switch 438 is pushed. A control circuit 440 is arranged to store current panning, tilting and zooming positions in a panning preset position storing part 426a, a tilting preset position storing part 426b and a zoom preset position storing part 426c within a preset position memory 426 in accordance with the preset signal "pss" from the preset switch 438 in the manual mode of the embodiment. In the preset mode of the embodiment, the control circuit 440 controls the panning driving circuit 408 to cause the video camera 400 to be moved at a high speed to a preset position in accordance with the output of the panning operation device 414 in the order of addresses or in the order of presetting as designated by the order designating device 424.

The embodiment may be arranged to permit selection of either the interlocked control as shown in FIG. 13 or the individual control as shown in FIG. 11.

Figure 14:
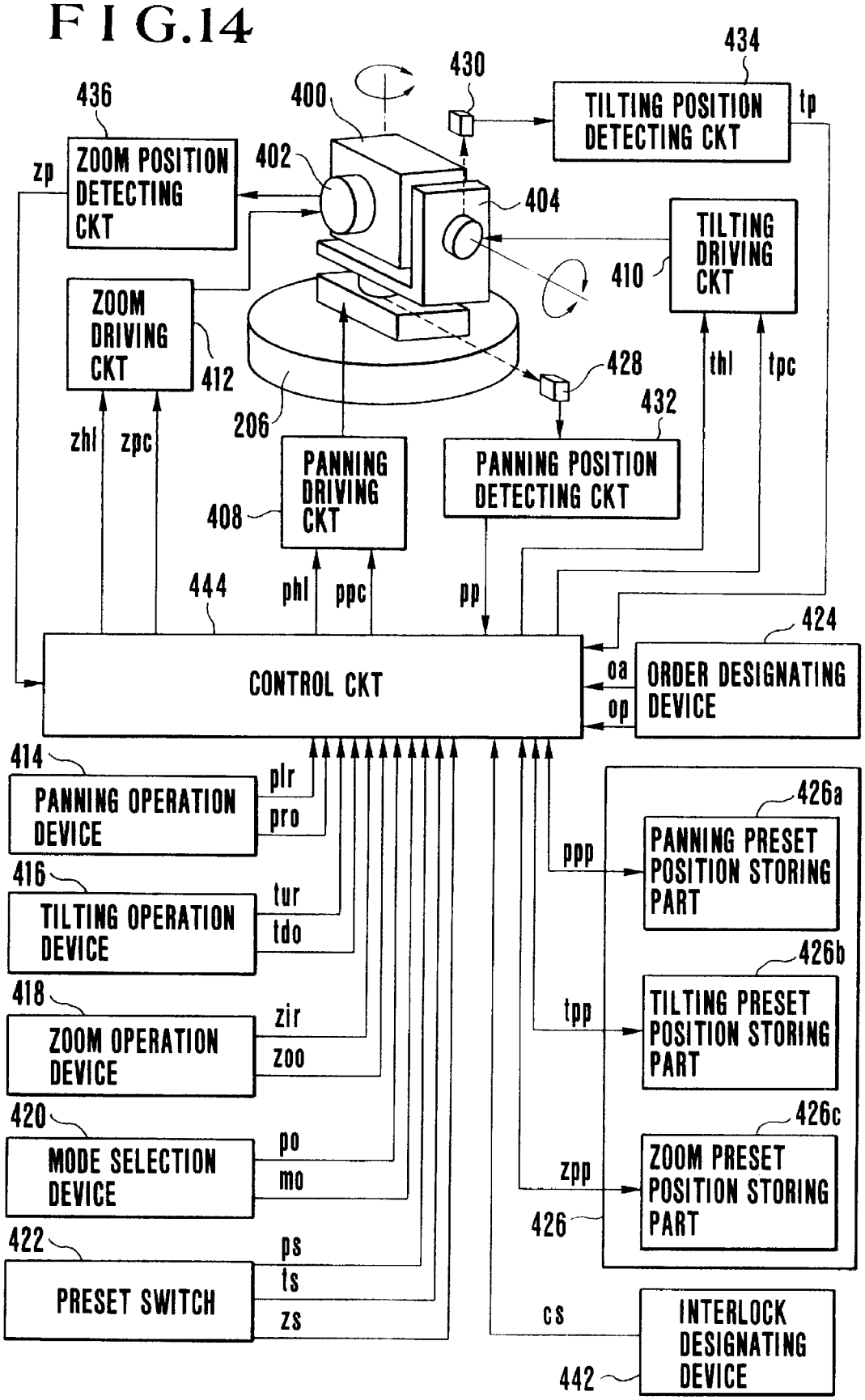
FIG. 14 is a block diagram showing in outline a camera control system arranged as a second example of modification of the embodiment shown in FIG. 11.

FIG. 14 is a block diagram showing in outline the arrangement of an embodiment which is arranged by way of example to permit selecting or not selecting the interlocked control as desired. In FIG. 14, the same component elements as those of FIG. 11 are indicated by the same reference numerals. Referring to FIG. 14, information on selecting or not selecting the interlocked control is supplied from an interlock designating device 442 to a control circuit 444. In the case of not selecting the interlocked control, the whole system is controlled by the control circuit 444 in exactly the same manner as described in the foregoing with reference to FIGS. 11 and 12. In the event of selecting the interlocked control, the embodiment operates as follows: in the preset mode, when an instruction is given from the panning operation device 414 to move the video camera 400, for example, from its current panned position to another panning position, the control circuit 444 reads out, from the preset position memory 426, not only the applicable panning preset position but also a tilting position and a zooming position which are obtained when the applicable panning preset position has been preset. The control circuit 444 then controls, in accordance with these preset positions, the driving circuits 408, 410 and 412 to cause the video camera 400 to be moved at a high speed to the applicable positions.

The control operation is carried out in the same manner as described above even in a case where the tilting operation device 416 or the zoom operation device 418 is operated in the preset mode. In that case, the control circuit 444 controls other control elements along with the applicable control element to move the video camera 400 to the desired positions.

Figure 15:
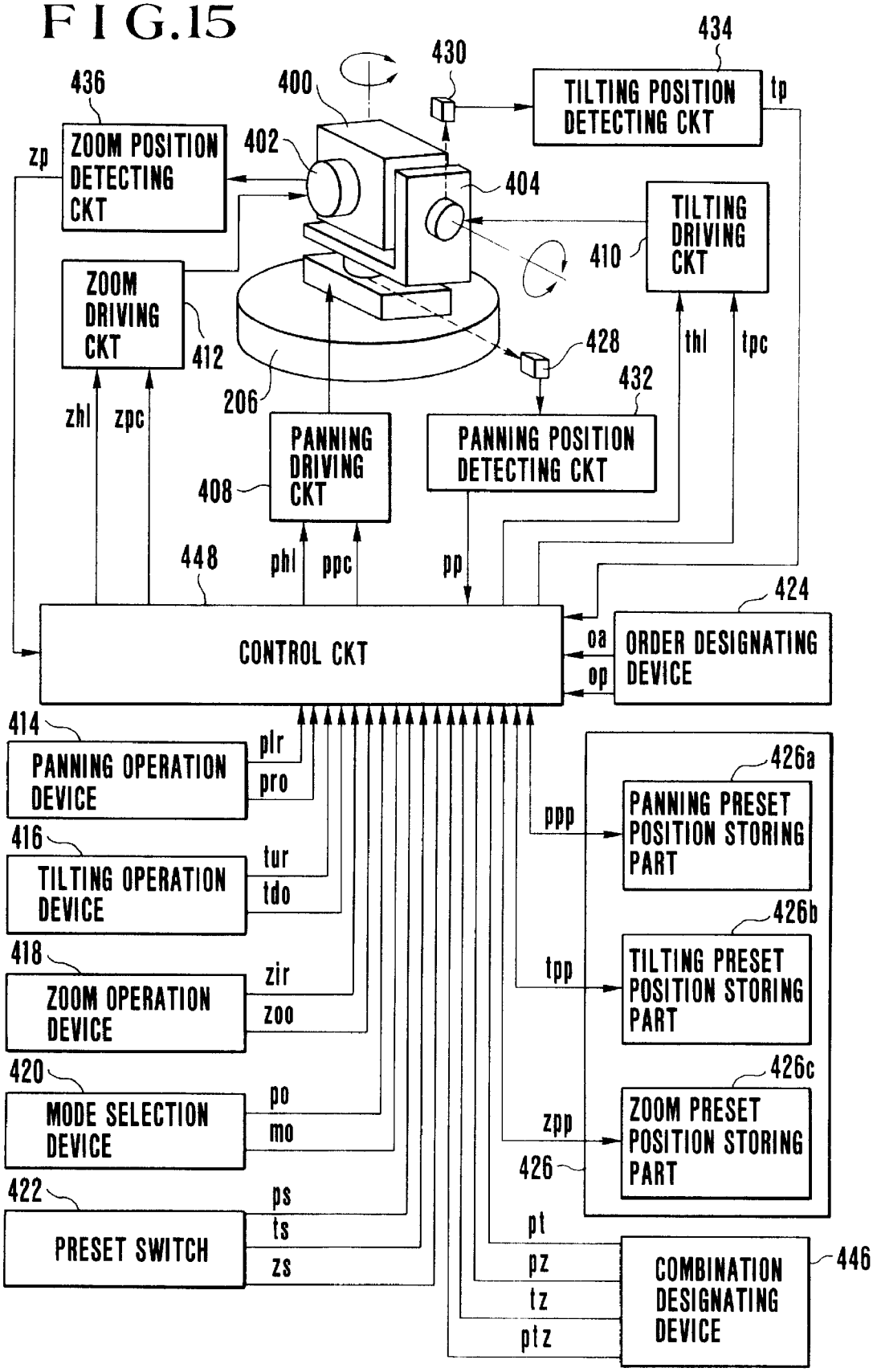
FIG. 15 is a block diagram showing in outline a camera control system arranged as a third example of modification of the embodiment shown in FIG. 11.

FIG. 15 is a block diagram showing in outline the arrangement of another embodiment which is arranged to permit selection of a combination of interlocked control elements. In FIG. 15, the same component elements as those shown in FIG. 11 are indicated by the same reference numerals. Referring to FIG. 15, the embodiment permits designation of a desired combination of interlocked control elements by means of a combination designating device 446. The combination designating device 446 is arranged to supply the control circuit 448 with a panning/tilting combining designation signal "pt" if panning and tilting are to be controlled in combination, a panning/zoom combining designation signal "pz" if panning and zooming are to be controlled in combination, a tilting/zoom combining designation signal "tz" if tilting and zooming are to be controlled in combination, and a panning/tilting/zoom combining designation signal "ptz" in a case where panning, tilting and zooming are to be controlled in combination.

The control circuit 448 controls the panning driving circuit 408 and the tilting driving circuit 410 in combination in response to the panning/tilting combining designation signal "pt", the panning driving circuit 408 and the zoom driving circuit 412 in combination for the panning/zoom combining designation signal "pz", the tilting driving circuit 410 and the zoom driving circuit 412 in combination for the tilting/zoom combining designation signal "tz", and the panning driving circuit 408, the tilting driving circuit 410 and the zoom driving circuit 412 in combination for the panning/tilting/zoom combining designation signal "ptz".

In a case where the combination of panning and tilting is designated by the combination designating device 446, for example, a panning preset position (or a tilting preset position) and a tilting preset position (or a panning preset position) obtained when the panning preset position (or the tilting preset position) has been preset are read out from the preset position memory 426 by the control circuit 448, in the order of presetting or in the order of addresses designated by the order designating device 424 according to the operation on the panning operation device 414 (or the tilting operation device 416). The control circuit 448 then controls the driving circuits 408 and 410 to cause the video camera 400 to be set in the applicable panning and tilting positions by high-speed driving.

Figure 16:
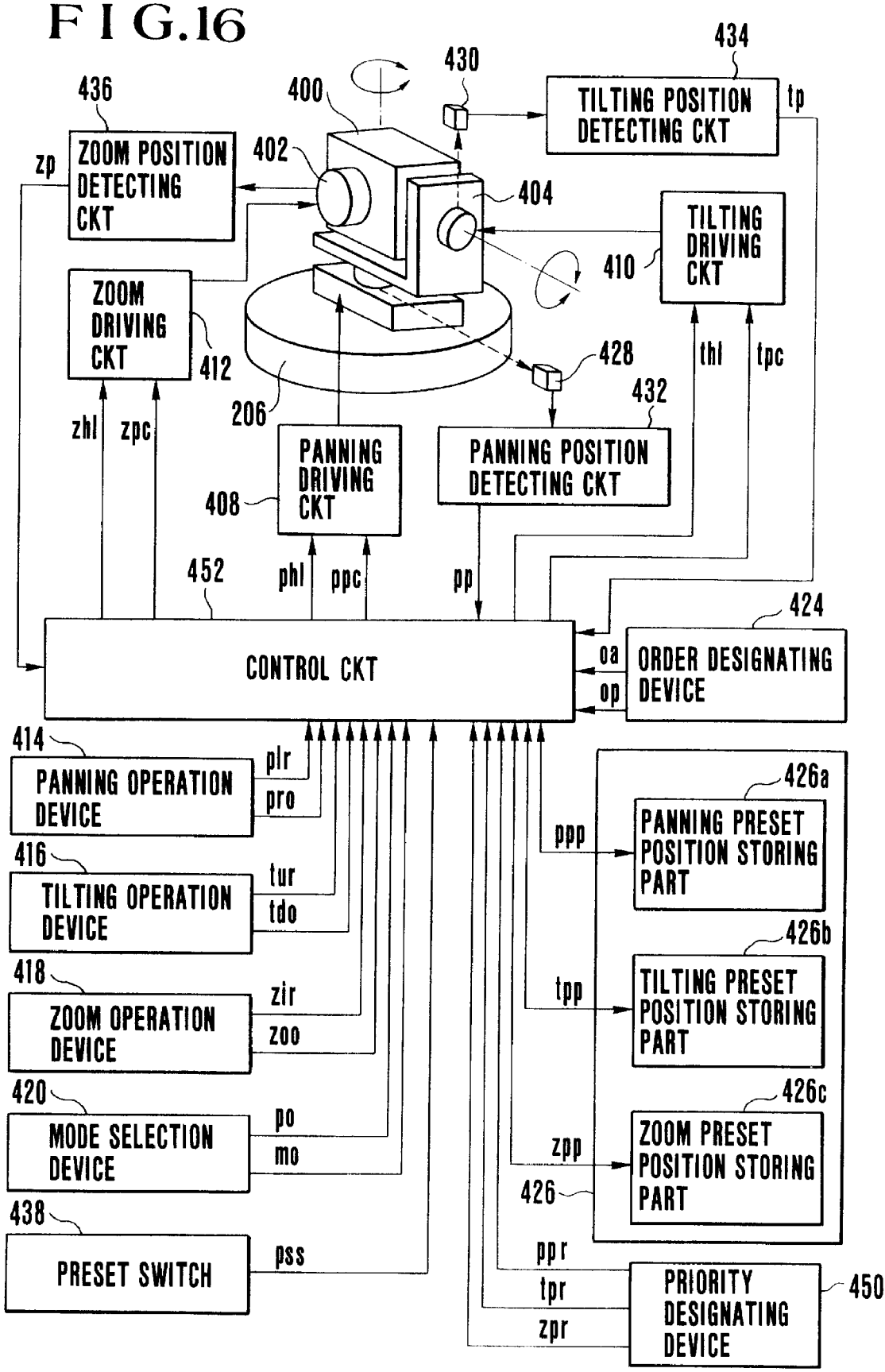
FIG. 16 is a block diagram showing in outline a camera control system arranged as a fourth example of modification of the embodiment shown in FIG. 11.

FIG. 16 is a block diagram showing in outline the arrangement of a further embodiment of this invention. In the case of the embodiment shown in FIG. 16, one of the panning, tilting and zooming control elements can be designated in preference to others by means of a priority designating device 450. The priority designating device 450 is arranged to output a panning position priority designation signal "ppr", a tilting position priority designation signal "tpr" or a zoom position priority designation signal "zpr" in response to designation of giving priority to panning, tilting or zooming.

In accordance with the priority designation signal "ppr", "tpr" or "zpr" received in the preset mode, the control circuit 452 performs a control action to move the video camera 400 in response to the operation on the operation device 414, 416 or 418. For example, for the tilting position priority designation signal "tpr", the control circuit 452 controls the camera position to shift it, on the basis of a tilting preset position, to panning and zooming positions obtained when the tilting position has been preset.

Each of the control circuits 413, 440, 444, 448 and 452 of the embodiments described with reference to FIGS. 11 to 16 can be arranged with a microcomputer. The functions described with reference to FIGS. 11 to 15 can be incorporated in the control circuit either individually or in combination without difficulty. Further, these functions can be combined with other functions. The designation of the interlocking relation and the priority relation by means of the interlock designating device 442, the combination designating device 446 and the priority designating device 450 of course can be accomplished also by arranging the driving circuits 408, 410 and 412 to be rendered operative or inoperative according to the designation.

The embodiment shown in FIG. 8 of course can be combined with the embodiments shown in FIGS. 11 to 16.

In the foregoing, the camera control elements have been described for panning, tilting and zooming. However, the invention is applicable also to aperture, sensitivity and color balance control elements.

As apparent from the foregoing description, the response delay of camera control can be automatically offset to facilitate control operations on the camera. The movement of the camera can be easily brought to a stop in any desired position even when the camera is moved at a high speed.

In accordance with the invention, the camera is arranged to be moved at a low speed in the manual operation mode and to be moved at a high speed to a registered preset position. The camera is therefore speedily operable. Further, since a plurality of camera control elements are controllable in desired sequence and combination, the camera position can be speedily shifted to any desired position.

What is claimed is:

1. A camera control system comprising:
   a) a camera arranged to pick up an image of an object of shooting and to output a image signal;
   b) coding means arranged to code said image signal and to output image data;
   c) transmission means for transmitting said image data to a designated place;
   d) decoding means arranged to decode said image data sent through said transmission means and to output a image signal obtained by decoding;
   e) display means for displaying a video image of said object carried by said image signal outputted from said decoding means;
   f) driving means for performing a driving action to vary a shooting condition of said camera;
   g) detection means arranged to detect the shooting condition of said camera and to output state data indicating the shooting condition of said camera;
   h) delay means arranged to delay said state data for a predetermined period of time and to output delayed state data;
   i) operation means arranged to output operation data indicating an instruction for varying the shooting condition of said camera; and
   j) control means arranged to give to said driving means an instruction signal for varying the shooting condition of said camera on the basis of said state data and said operation data while said operation means is in the process of being operated and, when said operation means is stopped from being operated, to give to said driving means an instruction signal for varying the shooting condition of said camera on the basis of said state data and said delayed state data obtained when said operation means is stopped from being operated.

2. A system according to claim 1, wherein said shooting condition includes at least one of panning, tilting and zooming positions of said camera.

3. A system according to claim 1, wherein said shooting condition includes an exposure condition of said camera.

4. A system according to claim 1, further comprising freezing means for freezing a display of an image picked up by said camera, while said instruction signal for varying the shooting condition of said camera is being given to said driving means on the basis of said state data and said delayed state data obtained when said operation means is stopped from being operated.

5. A system according to claim 1, wherein said shooting condition includes at least one of panning, tilting and zooming positions of said camera.

6. A system according to claim 1, wherein said shooting condition includes an exposure condition of said camera.

7. A system according to claim 1, further comprising freezing means for freezing a display of an image picked up by said camera, while said instruction signal for varying the shooting condition of said camera is being given to said driving means on the basis of said state data and said delayed state data obtained when said operation data stops being received by said control means.

8. An image conference system comprising:
   a) camera means arranged to pick up an image of an object of shooting and to output a image signal;
   b) coding means arranged to code said image signal and to output image data;
   c) transmission means for transmitting said image data to a designated place;
   d) decoding means arranged to decode said image data sent through said transmission means and to output a image signal obtained by decoding;
   e) display means for displaying a video image of said object carried by said image signal outputted from said decoding means;
   f) driving means for performing a driving action to vary a shooting condition of said camera;
   g) detection means arranged to detect the shooting condition of said camera and to output state data indicating the shooting condition of said camera;
   h) delay means arranged to delay said state data for a predetermined period of time and to output delayed state data;
   i) operation means arranged to output operation data indicating an instruction for varying the shooting condition of said camera; and
   j) control means arranged to give to said driving means an instruction signal for varying the shooting condition of said camera on the basis of said state data and said operation data while said operation means is in the process of being operated and, when said operation means is stopped from being operated, to give to said driving means an instruction signal for varying the shooting condition of said camera on the basis of said state data and said delayed state data obtained when said operation means is stopped from being operated, wherein, said means a) to j) being arranged in combination as one set, there are provided a plurality of sets of said means a) to j), which are interconnected through said transmission means.

9. A camera control system comprising:

a) a camera arranged to pick up an image of an object of shooting and to output a image signal;

b) coding means arranged to code said image signal and to output image data;

c) transmission means for transmitting said image data to a designated place;

d) decoding means arranged to decode said image data sent through said transmission means and to output a image signal obtained by decoding;

e) display means for displaying a video image of said object carried by said image signal outputted from said decoding means;

f) driving means for performing a driving action to vary an exposure of said camera;

g) detection means arranged to detect a level of the image signal outputted from said camera and to output level data;

h) delay means arranged to delay said level data for a predetermined period of time and to output delayed level data;

i) operation means arranged to output operation data indicating an instruction for varying the exposure of said camera; and j) control means arranged to give to said driving means an instruction signal for varying the exposure of said camera on the basis of said level data and said operation data while said operation means is in the process of being operated and, when said operation means is stopped from being operated, to give to said driving means an instruction signal for varying the exposure of said camera on the basis of said level data and said delayed level data obtained when said operation means is stopped from being operated.

10. An image communication terminal unit comprising:

a) a camera arranged to pick up an image of an object of shooting and to output an image signal;

b) a display device for displaying said image signal; and c) control means arranged to perform predetermined control over said camera and, after said predetermined control, to perform reverse control over said camera in a direction reverse to the direction of movement of said camera of said predetermined control as much as an amount of movement of said camera corresponding to a time delay of said predetermined control.

11. A unit according to claim 10, wherein said control means is arranged to freeze a display of an image picked up by said camera at least during the process of said reverse control over said camera.

12. A unit according to claim 11, wherein said control means is arranged to freeze a display of an image picked up by said camera for a length of time during which said time delay exists in said predetermined control over said camera in addition to a length of time required for said reverse control over said camera.

13. A unit according to claim 10, further comprising:

d) storing means for storing a designated control position of said camera;

e) input means arranged to permit inputting an operation to be performed on said camera;

f) mode designating means for selectively designating either a manual operation mode or a preset operation mode; and g) driving means arranged to operate said camera at a low speed according to an input obtained by said input means in said manual operation mode and, in said preset operation mode, to operate and move said camera at a high speed to a position corresponding to a preset position stored in said storing means for a predetermined operation designated by said input means.

14. A camera control system comprising:

a) a camera arranged to pick up an image of an object of shooting and to output an image signal;

b) input means arranged to permit inputting an operation to be performed on said camera and to output a signal corresponding to the operation;

c) control signal forming means for forming a control signal for controlling said camera according to the signal outputted from said input means;

d) processing means arranged to form a reverse control signal for a predetermined amount of reverse movement of the camera in a direction reverse to the direction in which the camera operates according to the control signal upon termination of the control signal outputted from said control signal forming means and to freeze a display of the object image picked up by said camera for a length of time including at least a length of time between the end of the operation of said input means and the end of said predetermined amount of reverse movement of the camera; and e) control means for controlling said camera according to an output of said control signal forming means and an output of said processing means.

15. A system according to claim 14, wherein said control means is arranged to control at least one of panning means, tilting means and zooming means provided for said camera.

16. A camera control system for controlling a camera, comprising:

a) storing means for storing designated control positions of camera control elements of said camera;

b) input means for permitting input of an operation to be performed on said camera;

c) mode designating means for designating at least either a manual operation mode or a preset operation mode;

d) driving means for driving each of said camera control elements at a designated speed; and e) control means for controlling said driving means, said control means being arranged to cause said driving means to drive, in said manual operation mode, at a low speed the camera control element corresponding to the input obtained by said input means and to drive, in said preset operation mode, at a high speed the camera control element designated by said input means to a position corresponding to a preset position of said designated camera control element stored in said storing means, and said control means being further arranged such that, in carrying out predetermined control over a driving action of each of said camera control elements, said control means performs a reverse control over said camera in a direction reverse to the direction of movement of said camera of said predetermined control to an amount of said camera corresponding to a time delay resulting from said predetermined control.

17. A system according to claim 16, wherein said camera control elements include at least one of panning means, tilting means and zooming means for said camera.

18. A system according to claim 16, further comprising priority designating means for designating priority of control over said camera control elements being controlled.

19. A system according to claim 13, wherein said control means is arranged to freeze a display of an image picked up by said camera at least during the process of said reverse control.

20. A camera control system comprising:
   a) coding means arranged to code an image signal outputted by a camera, and to output image data;
   b) transmission means for transmitting said image data to a designated place;
   c) driving means for performing a driving action to vary a shooting condition of said camera;
   d) detection means arranged to detect the shooting condition of said camera and to output state data indicating the shooting condition of said camera;
   e) delay means arranged to delay said state data for a predetermined period of time and to output delayed state data; and
   f) control means for receiving operation data indicating an instruction for varying the shooting condition of said camera and arranged to give said driving means an instruction signal for varying the shooting condition of said camera on the basis of said state data and said delayed state data obtained when said operation data stops being received by said control means.

* * * * *

UNITED STATES PATENT AND TRADEMARK OFFICE
CERTIFICATE OF CORRECTION

PATENT NO. : 5,838,368
DATED : November 17, 1998
INVENTOR(S) : Makoto Masunaga, et al.

It is certified that error appears in the above-indentified patent and that said Letters Patent is hereby corrected as shown below:

Column 31, line 13, delete "13" and insert --16--.

Signed and Sealed this

Fifth Day of October, 1999

*Attest:*

Q. TODD DICKINSON

*Attesting Officer*  Acting Commissioner of Patents and Trademarks